US009721424B2

(12) United States Patent
Arnone et al.

(10) Patent No.: US 9,721,424 B2
(45) Date of Patent: Aug. 1, 2017

(54) SUPPLEMENTARY MODE OF AN INTERLEAVED WAGERING SYSTEM

(71) Applicant: Gamblit Gaming, LLC, Glendale, CA (US)

(72) Inventors: Miles Arnone, Sherborn, MA (US); Frank Cire, Pasadena, CA (US); Clifford Kaylin, Los Angeles, CA (US); Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 270 days.

(21) Appl. No.: 14/550,802

(22) Filed: Nov. 21, 2014

(65) Prior Publication Data

US 2015/0099578 A1 Apr. 9, 2015

Related U.S. Application Data

(63) Continuation-in-part of application No. PCT/US2014/059563, filed on Oct. 7, 2014.
(Continued)

(51) Int. Cl.
*G06F 17/00* (2006.01)
*G07F 17/32* (2006.01)

(52) U.S. Cl.
CPC ...... *G07F 17/3225* (2013.01); *G07F 17/3267* (2013.01)

(58) Field of Classification Search
USPC ...................................................... 463/16–26
See application file for complete search history.

(56) References Cited

U.S. PATENT DOCUMENTS 5,413,357 A 5/1995 Schulze et al.
5,718,429 A 2/1998 Keller
(Continued)

OTHER PUBLICATIONS

U.S. Appl. No. 14/205,303 Arnone, et al., filed Mar. 11, 2014.
(Continued)

*Primary Examiner* — Ronald Laneau
(74) *Attorney, Agent, or Firm* — Caitlyn Ross

(57) ABSTRACT

An interleaved wagering system is disclosed. The system includes an interactive controller constructed to communicate application telemetry associated with an interactive application provided by the interactive controller. The system also includes a wager controller constructed to communicate a wager result associated with a received wager request. The system also includes the application controller operatively connected to the interactive controller and the wager controller, and constructed to: receive application telemetry; upon receiving application telemetry, determine whether to trigger a supplementary mode; when triggering the supplementary mode is determined, communicate a notification to provide a supplementary mode session. The interactive controller is further constructed to: provide the supplementary mode session upon receiving the supplementary mode notification; communicate results of the supplementary mode session. The application controller is further constructed to: receive the results of the supplementary mode session; and when the received results are successful, communicate a request for benefits.

25 Claims, 15 Drawing Sheets

Related U.S. Application Data

(60) Provisional application No. 61/911,755, filed on Dec. 4, 2013, provisional application No. 61/887,758, filed on Oct. 7, 2013.

(56) References Cited

U.S. PATENT DOCUMENTS

| | | | |
|---|---|---|---|
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,938,727 | B1 | 5/2011 | Konkle |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,475,266 | B2 | 7/2013 | Arnone |
| 8,480,470 | B2 | 7/2013 | Napolitano et al. |
| 8,622,809 | B1 | 1/2014 | Arora et al. |
| 2001/0004609 | A1 | 6/2001 | Walker et al. |
| 2001/0019965 | A1 | 9/2001 | Ochi |
| 2002/0022509 | A1 | 2/2002 | Nicastro |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |

(56) References Cited

U.S. PATENT DOCUMENTS

| | | | |
|---|---|---|---|
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |
| 2009/0239610 | A1 | 9/2009 | Olive |
| 2009/0247272 | A1 | 10/2009 | Abe |
| 2009/0270164 | A1 | 10/2009 | Seelig |
| 2009/0275411 | A1 | 11/2009 | Kisenwether |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis |
| 2010/0004058 | A1 | 1/2010 | Acres |
| 2010/0016056 | A1 | 1/2010 | Thomas et al. |
| 2010/0029373 | A1 | 2/2010 | Graham et al. |
| 2010/0035674 | A1 | 2/2010 | Slomiany |
| 2010/0056247 | A1 | 3/2010 | Nicely |
| 2010/0056260 | A1 | 3/2010 | Fujimoto |
| 2010/0062836 | A1 | 3/2010 | Young |
| 2010/0093420 | A1 | 4/2010 | Wright |
| 2010/0093444 | A1 | 4/2010 | Biggar et al. |
| 2010/0105454 | A1 | 4/2010 | Weber |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0184509 | A1 | 7/2010 | Sylla et al. |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0304825 | A1 | 12/2010 | Davis |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gerson |
| 2011/0045896 | A1 | 2/2011 | Sak et al. |
| 2011/0077087 | A1 | 3/2011 | Walker et al. |
| 2011/0082571 | A1 | 4/2011 | Murdock et al. |
| 2011/0105206 | A1 | 5/2011 | Rowe et al. |
| 2011/0107239 | A1 | 5/2011 | Adoni |
| 2011/0109454 | A1 | 5/2011 | McSheffrey |
| 2011/0111820 | A1 | 5/2011 | Filipour |
| 2011/0111837 | A1 | 5/2011 | Gagner |
| 2011/0111841 | A1 | 5/2011 | Tessmer |
| 2011/0118011 | A1 | 5/2011 | Filipour et al. |
| 2011/0201413 | A1 | 8/2011 | Oberberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0230267 | A1 | 9/2011 | Van Luchene |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2011/0319169 | A1 | 12/2011 | Lam |
| 2012/0004747 | A1 | 1/2012 | Kelly |
| 2012/0028718 | A1 | 2/2012 | Barclay et al. |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0135793 | A1 | 5/2012 | Antonopoulos |
| 2012/0202587 | A1 | 8/2012 | Allen |
| 2012/0302311 | A1 | 11/2012 | Luciano |
| 2012/0322545 | A1* | 12/2012 | Arnone ............... G07F 17/3272 463/25 |
| 2013/0029760 | A1* | 1/2013 | Wickett .............. G07F 17/3267 463/29 |
| 2013/0131848 | A1 | 5/2013 | Arnone et al. |
| 2013/0190074 | A1 | 7/2013 | Arnone et al. |
| 2013/0260869 | A1 | 10/2013 | Basallo et al. |
| 2014/0087801 | A1 | 3/2014 | Nicely et al. |
| 2014/0087808 | A1 | 3/2014 | Basallo et al. |
| 2014/0087809 | A1 | 3/2014 | Leupp et al. |
| 2015/0269811 | A1* | 9/2015 | Arnone ............... G07F 17/3244 463/25 |

OTHER PUBLICATIONS

U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 24, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.

(56) References Cited

OTHER PUBLICATIONS

U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.

* cited by examiner

SUPPLEMENTARY MODE OF AN INTERLEAVED WAGERING SYSTEM

CROSS REFERENCE TO RELATED APPLICATIONS

This application is a continuation-in-part of Patent Cooperation Treaty (PCT) Application No. PCT/US14/59563, filed Oct. 7, 2014, which claims priority of U.S. Provisional Patent Application No. 61/887,758, filed Oct. 7, 2013; furthermore, this application claims priority to U.S. Provisional Patent Application No. 61/911,755, filed Dec. 4, 2013, the disclosures of each of which are incorporated by reference herein in its entirety.

This application references Patent Cooperation Treaty Application No. PCT/US11/26768, filed Mar. 1, 2011, Patent Cooperation Treaty Application No. PCT/US11/63587, filed Dec. 6, 2011, and Patent Cooperation Treaty Application No. PCT/US12/58156, filed Sep. 29, 2012, the contents of each of which are hereby incorporated by reference.

FIELD OF THE INVENTION

Embodiments of the present invention are generally related to communications within data processing systems. More particularly, the present invention relates to the communication and processing of wagering data.

BACKGROUND

The gaming industry has traditionally developed electronic gaming machines that present simple wagering games to a user. The communication and processing needs for these simple wagering games are easily met using conventional processing systems. However, more complicated wagering games need communication and processing systems that are better suited for implementing these more complicated wagering games. Various aspects of embodiments of the present invention meet such a need.

SUMMARY OF THE INVENTION

Systems and methods in accordance with embodiments of the invention provide a communication and data processing system constructed for an interleaved wagering system.

In an example embodiment, an interleaved wagering system, comprises an interactive controller constructed to communicate, to an application controller, application telemetry associated with an interactive application provided by the interactive controller; a wager controller constructed to communicate, to the application controller, a wager result associated with a received wager request; and the application controller operatively connected to the interactive controller and the wager controller. The application controller is constructed to: receive, from the interactive controller, application telemetry; upon receiving the application telemetry, determine whether to trigger a supplementary mode; when triggering the supplementary mode is determined, communicate, to the interactive controller, a notification to provide a supplementary mode session. The interactive controller is further constructed to: receive, from the application controller, the notification to provide the supplementary mode session; provide the supplementary mode session; communicate, to the application controller, results of the supplementary mode session. The application controller is further constructed to: receive, from the interactive controller, the results of the supplementary mode session; and when the received results are successful, communicate, to a benefit pool controller, a request for benefits.

In some embodiments, the interactive controller and the application controller are constructed from the same device, and the application controller is operatively connected to the wager controller by a network.

In some embodiments, the wager controller and the application controller are constructed from the same device, and the application controller is operatively connected to the interactive controller by a network.

In some embodiments, the application controller is further constructed to store a parameter value; and update the parameter value based on the received application telemetry, and triggering the supplementary mode is based on whether the updated parameter value exceeds a threshold value.

In some embodiments, triggering the supplementary mode is based on an indication received from a third party.

In some embodiments, the benefit pool controller is constructed to: accumulate a benefit pool; receive, from the application controller, a request for benefits; and communicate, to the application controller, benefits, based on the request for benefits. In some embodiments, the benefit pool is be accumulated based on a benefit contribution received from the wager controller. In some embodiments, the benefit pool is accumulated based on benefits received from a third party, where the third party is an operator of the interleaved wagering system.

In some embodiments, the results of the supplementary mode session is based on skill. In some embodiments, the results of the supplementary mode session is based on chance. In some embodiments, the results of the supplementary mode session is based on skill and chance.

In another example embodiment, an application controller of an interleaved wagering system comprises: an interactive controller interface operatively connecting the application controller to an interactive controller constructed to communicate, to an application controller, application telemetry associated with an interactive application provided by the interactive controller; a wager controller interface operatively connecting the application controller to a wager controller constructed to communicate, to the application controller, a wager result associated with a received wager request; and one or more processing modules constructed to: receive, from the interactive controller, application telemetry; upon receiving the application telemetry, determine whether to trigger a supplementary mode; when triggering the supplementary mode is determined, communicate, to the interactive controller, a notification to provide a supplementary mode session. The interactive controller is further constructed to: receive, from the application controller, the notification to provide the supplementary mode session; provide the supplementary mode session; communicate, to the application controller, results of the supplementary mode session. The application controller is further constructed to: receive, from the interactive controller, the results of the supplementary mode session; and when the received results are successful, communicate, to a benefit pool controller, a request for benefits.

In another example embodiment, an interleaved wagering system comprises: a wager controller constructed to communicate, to the application controller, a wager result associated with a received wager request; and an application controller of an interleaved wagering system operatively connecting the wager controller to an interactive controller by a network. The application controller is constructed to: receive, from the interactive controller, application telemetry associated with an interactive application provided by the interactive controller; upon receiving the application telemetry, determine whether to trigger a supplementary mode; when triggering the supplementary mode is determined, communicate, to the interactive controller, a notification to provide a supplementary mode session; receive, from the interactive controller, the results of the supplementary mode session; and when the received results are successful, communicate, to a benefit pool controller, a request for benefits.

In another example embodiment, an interleaved wagering system, comprises: an interactive controller of an interleaved wagering system constructed to communicate, to an application controller, application telemetry associated with an interactive application provided by the interactive controller; and an application controller of an interleaved wagering system operatively connecting the interactive controller to a wager controller. The application controller is constructed to: receive, from the interactive controller, application telemetry; upon receiving the application telemetry, determine whether to trigger a supplementary mode; when triggering the supplementary mode is determined, communicate, to the interactive controller, a notification to provide a supplementary mode session. The interactive controller is further constructed to: receive, from the application controller, the notification to provide the supplementary mode session; provide the supplementary mode session; communicate, to the application controller, results of the supplementary mode session. The application controller is further constructed to: receive, from the interactive controller, the results of the supplementary mode session; and when the received results are successful, communicate, to a benefit pool controller, a request for benefits.

DETAILED DESCRIPTION

Figure 1:
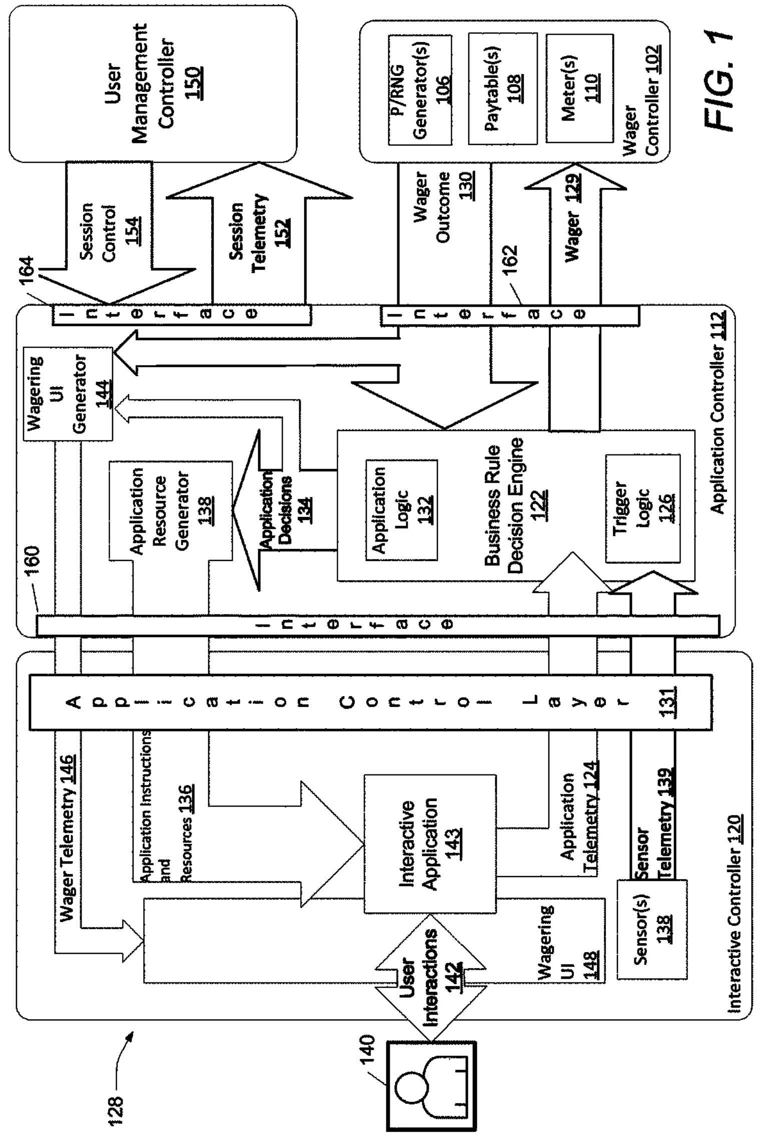
FIG. 1 is a diagram of a structure of an interleaved wagering system in accordance with various embodiments of the invention.

An interleaved wagering system interleaves wagering with non-wagering activities. In some embodiments of an interleaved wagering system an interactive application executed by an interactive controller provides non-wagering components of the interleaved wagering system. The interactive controller is operatively connected to an application controller that manages and configures the interactive application of the interactive controller and determines when wagers should be interleaved with the operations of the interactive application. The application controller is further operatively connected to a wager controller that provides one or more wagering propositions for one or more wagers.

In some embodiments, the interactive controller also includes a wagering user interface that is used to display data about a wagering process, including but not limited a wager outcome of a wager made in accordance with a wagering proposition. The content of the wagering user interface is controlled by the application controller and includes content provided by the wager controller.

In several embodiments, a user or user interactions are represented in an interleaved wagering system by the electronic representation of interactions between the user and the interactive application, typically received via a user interface of the interactive application, and a user profile of the interleaved wagering system associated with the user.

Many different types of interactive applications may be utilized with the interleaved wagering system. In some embodiments, the interactive application reacts to the physical activity of the user. In these embodiments, the user interacts with the interactive application through one or more sensors that monitor the user's physical activities. Such sensors may include, but are not limited to, physiological sensors that monitor the physiology of the user, environmental sensors that monitor the physical environment of the user, accelerometers that monitor changes in motion of the user, and location sensors that monitor the location of the user such as global positioning sensors.

In some embodiments, the interactive application is a skill-based interactive game that is played by the user.

In some embodiments, the interactive application is a tool used by the user to achieve some useful goal.

In operation, a user interacts with the interactive application using various types of elements of the interactive application in an interactive application environment. Elements are interactive application resources utilized by the user within the interactive application environment to provide an interactive experience for the user. Wagers of credits are made in accordance with a wagering proposition as triggered by the user's use of one or more of the elements of the interactive application. Wager outcomes of wagers of credits made in accordance with the wagering proposition can cause consumption, loss or accrual of credits.

In accordance with some embodiments, wager outcomes of wagering events can influence elements in the interactive application such as, but not limited to, providing one or more new elements, restoring one or more consumed elements, causing the loss of one or more elements, and restoration or placement of one or more fixed elements.

In various embodiments, the wagers may be made using real world credit (RC). In some embodiments, RC can be one or more credits that are purchased using, and redeemed in, a real world currency having a real world value.

In many embodiments, RC can be one or more credits in a virtual currency. Virtual currency can be thought of as a form of alternate currency that can be acquired, purchased or transferred in unit or in bulk by or to a user but does not necessarily directly correlate to a real currency. In many such embodiments, RC are allowed to be purchased using a real world currency but are prevented from being redeemed in a real world currency having a real world value.

In several embodiments, during interaction with the interactive application using the elements, a user can optionally consume and/or accrue application environment credit (AC) within the interactive application as a result of the user's use of the interactive application. AC can be in the form of, but is not limited to, application environment credits, experience points, and points generally.

In various embodiments, when the interactive application is a skill-based interactive game, AC is awarded to a player of the skill-based interactive game on the basis of the player's skillful play of the skill-based interactive game. In such embodiments, AC may be analogous to the score in a typical video game. The skill-based interactive game can have one or more scoring criteria, embedded within an application controller and/or an interactive controller that provides the skill-based interactive game that reflect user performance against goal(s) of the skill-based interactive game.

In many embodiments, AC can be used to purchase in-game items, including but not limited to, elements that have particular properties, power ups for existing items, and other item enhancements. In many embodiments, AC may be used to earn entrance into a sweepstakes drawing, to earn entrance in a tournament with prizes, to score in the tournament, and/or to participate and/or score in any other game event. In many embodiments, AC can be stored on a user-tracking card or in a network-based user tracking system where the AC is attributed to a specific user.

In many embodiments, a wagering proposition includes a wager of AC for a wager outcome of a randomly generated payout of interactive application AC, elements, and/or objects in accordance with a wagering proposition.

In a number of embodiments, a wager of an amount of RC results in a wager outcome of a payout of AC, elements, and/or objects that have an RC value if cashed out.

In some embodiments, in a case that an interactive application is a skill-based interactive game, interactive application objects include in-game objects that may be used by a player of the skill-based interactive game to enhance the player's gameplay of the skill-based interactive game. Such objects include, but are not limited to, power-ups, enhanced in-game items, and the like. In some embodiments, the interactive application objects include objects that are detrimental to the player's play of the skill-based interactive game such as, but not limited to, obstructions in the game space, a temporary player handicap, an enhanced opponent, and the like.

In some embodiments, elements in an interactive application include, but are not limited to, enabling elements (EE) that are interactive application environment resources utilized during the user's use of the interactive application and whose utilization by the user while using the interactive application triggers execution of a wager in accordance with a wagering proposition. In another embodiment, elements in an interactive application include, but are not limited to, a reserve enabling element (REE), that is an element that converts into one or more enabling elements upon occurrence of a release event during an interactive session. In yet another embodiment, elements in an interactive application include, but are not limited to, an actionable element (AE) that is an element that is acted upon during use of the interactive application to trigger a wager in accordance with a wagering proposition and may or may not be restorable during normal play of the interactive application. In yet another embodiment, elements in an interactive application include, but are not limited to, a common enabling element (CEE) that is an element that may be shared by two or more users and causes a wagering event and associated wager to be triggered in accordance with the wagering proposition when used by one of the users during use of the interactive application. In some embodiments, in progressing through interactive application use, a user can utilize elements during interactions with a controlled entity (CE). A CE is a character, entity, inanimate object, device or other object under control of a user.

In accordance with some embodiments of an interleaved wagering system, the triggering of the wagering event and/or wager can be dependent upon an interactive application environment variable such as, but not limited to, a required object (RO), a required environmental condition (REC), or a controlled entity characteristic (CEC). A RO is a specific interactive application object in an interactive application acted upon for an AE to be completed. A non-limiting example of an RO is a specific key needed to open a door. An REC is an interactive application state present within an interactive application for an AE to be completed. A non-limiting example of an REC is daylight whose presence enables a character to walk through woods. A CEC is a status of the CE within an interactive application for an AE to be completed. A non-limiting example of a CEC is requirement that a CE have full health points before entering battle. Although various interactive application resources such as, but not limited to, the types of interactive application elements as discussed herein may be used to trigger a wager in accordance with a wagering proposition, one skilled in the art will recognize that any interactive application resource can be utilized in an interleaved wagering system to trigger of a wager as appropriate to the specification of a specific application in accordance with various embodiments of the invention.

In several embodiments, an interleaved wagering system can utilize an application controller to monitor use of the interactive application executed by an interactive controller for detecting a trigger of a wagering event. The trigger for the wagering event can be detected by the application controller from the utilization of the interactive application in accordance with at least one wagering event occurrence rule. The trigger of the wagering event can be communicated to a wager controller. In response to notification of the trigger, the wager controller executes a wager in accordance with a wagering proposition. In addition, use of an interactive application in an interleaved wagering system can be modified by the application controller based upon the wager outcome.

In several embodiments, a wagering event occurrence can be determined from one or more application environment variables within an interactive application that are used to trigger a wager and/or associated wager in accordance with a wagering proposition. Application environment variables can include, but are not limited to, passage of a period of time during interleaved wagering system interactive application use, a result from an interleaved wagering system interactive application session (such as, but not limited to, achieving a goal or a particular score), a user action that is a consumption of an element, or a user action that achieves a combination of elements to be associated with a user profile.

In numerous embodiments, an interactive application instruction is an instruction to an interactive controller and/or an interactive application to modify an interactive application state or modify one or more interactive application resources. In some embodiments, the interactive application instructions may be based upon one or more of a wager outcome and application environment variables. An interactive application instruction can modify any aspect of an interactive application, such as, but not limited to, an addition of a period of time available for a current interactive application session for the interactive application of interleaved wagering system, an addition of a period of time available for a future interleaved wagering system interactive application session or any other modification to the interactive application elements that can be utilized during interactive application use. In some embodiments, an interactive application instruction can modify a type of element whose consumption triggers a wagering event occurrence. In many embodiments, an interactive application instruction can modify a type of element whose consumption is not required in a wagering event occurrence.

In a number of embodiments, a user interface can be utilized that depicts a status of the interactive application in the interleaved wagering system. A user interface can depict any aspect of an interactive application including, but not limited to, an illustration of interleaved wagering system interactive application use advancement as a user uses the interleaved wagering system.

In some embodiments, an interleaved wagering system including an application controller operatively connected to a wager controller and operatively connected to an interactive controller may provide for interleaving entertainment content from an interactive application. The interleaved wagering system provides for random wager outcomes in accordance with the wagering proposition that are independent of user skill while providing an interactive experience to the user that may be shaped by the user's skill.

In several embodiments, an application controller of an interleaved wagering system may provide for a communications interface for asynchronous communications between a wager controller and an interactive application provided by an interactive controller, by operatively connecting the interactive controller, and thus the interactive controller's interactive application, with the wager controller. In some embodiments, asynchronous communications provided for by an interleaved wagering system may reduce an amount of idle waiting time by an interactive controller of the interleaved wagering system, thus increasing an amount of processing resources that the interactive controller may provide to an interactive application or other processes of the interactive controller. In many embodiments, asynchronous communications provided for by an interleaved wagering system reduces an amount of idle waiting time by a wager controller, thus increasing an amount of processing resources that the wager controller may provide to execution of wagers to determine wager outcomes, and other processes provided by the wager controller. In some embodiments, a wager controller of an interleaved wagering system may be operatively connected to a plurality of interactive controllers through one or more application controllers and the asynchronous communications provided for by the one or more application controllers allows the wager controller to operate more efficiently and provide wager outcomes to a larger number of interactive controllers than would be achievable without the one or more application controllers of the interleaved wagering system.

In some embodiments, an interleaved wagering system including an application controller operatively connected to a wager controller and operatively connected to an interactive controller may provide for simplified communication protocols for communications of the interactive controller as the interactive controller may communicate user interactions with an interactive application provided by the interactive controller to the application controller without regard to a nature of a wagering proposition to be interleaved with processes of the interactive application.

In various embodiments, an interleaved wagering system including an application controller operatively connected to a wager controller and operatively connected to an interactive controller may provide for simplified communication protocols for communications of the wager controller as the wager controller may receive wager requests and communicate wager outcomes without regard to a nature of an interactive application provided by the interactive controller.

Various types interleaved wagering systems are discussed in Patent Cooperation Treaty Application No. PCT/US11/26768, filed Mar. 1, 2011, Patent Cooperation Treaty Application No. PCT/US11/63587, filed Dec. 6, 2011, and Patent Cooperation Treaty Application No. PCT/US12/58156, filed Sep. 29, 2012, the contents of each of which are hereby incorporated by reference in their entirety.

Wagering Interleaved Systems

FIG. 1 is a diagram of a structure of an interleaved wagering system in accordance with various embodiments of the invention. The interleaved wagering system 128 includes an interactive controller 120, an application controller 112, and a wager controller 102. The interactive controller 120 is operatively connected to, and communicates with, the application controller 112. The application controller 112 is also operatively connected to, and communicates with, the wager controller 102.

In several embodiments, the wager controller 102 is a controller for providing one or more wagering propositions provided by the interleaved wagering system 128 and executes wagers in accordance with the wagering propositions. Types of value of a wager can be one or more of several different types. Types of value of a wager can include, but are not limited to, a wager of an amount of RC corresponding to a real currency or a virtual currency, a wager of an amount of AC earned by the player through use of an interactive application, a wager of an amount of elements of an interactive application, and a wager of an amount of objects used in an interactive application. A wager outcome determined for a wager in accordance with a wagering proposition can increase or decrease an amount of the type of value used in the wager, such as, but not limited to, increasing an amount of RC for a wager of RC. In various embodiments, a wager outcome determined for a wager in accordance with a wagering proposition can increase or decrease an amount of a type of value that is different than a type of value of the wager, such as, but not limited to, increasing an amount of an object of an interactive application for a wager of RC.

In many embodiments, the wager controller 120 includes one or more pseudo random or random number generators (P/RNG) 106 for generating random results, one or more paytables 108 for determining a wager outcome from the random results, and one or more credit or value meters 110 for storing amounts of wagered and won credits.

The one or more P/RNG generators 106 execute processes that can generate random or pseudo random results. The one or more paytables 108 are tables that can be used in conjunction with the random or pseudo random results to determine a wager outcome including an amount of RC, AC, elements or objects won as a function of interleaved wagering system use. There can be one or more paytables 108 in the wager controller 102. The paytables 108 are used to implement one or more wagering propositions in conjunction with a random output of the random or pseudo random results.

In some embodiments, selection of a paytable to use to execute a wager can be based on factors including, but not limited to, interactive application progress a user has achieved through use of the interactive application, user identification, and eligibility of the user for bonus rounds.

In various embodiments, the interactive controller 120 provides an interactive application 143 and provides human input devices (HIDs) and output devices for interacting with the user 140. The interactive controller 120 provides for user interactions 142 with the interactive application 143 by receiving input from a user through the HIDs and providing outputs such as video, audio and/or other sensory output to the user using the output devices.

The interactive controller 120 is operatively connected to, and communicates with, the application controller 112. The interactive controller communicates application telemetry data 124 to the application controller 112 and receives application instructions and resources 136 from the application controller 112. Via the communication of application instructions and resources 136, the application controller 112 can communicate certain interactive application resources including control parameters to the interactive application 143 to affect the interactive application's execution by the interactive controller 120. In various embodiments, these interactive application control parameters can be based on a wager outcome of a wager that was triggered by an element in the interactive application being utilized or acted upon by the user.

In some embodiments, execution of the interactive application by the interactive controller 120 communicates user interactions with the interactive application to the application controller 112. The application telemetry data 124 includes, but is not limited to, the user's utilization of the elements in the interactive application.

In some embodiments, the interactive application 143 is a skill-based interactive game. In such embodiments, execution of the skill-based interactive game by the interactive controller 120 is based on the user's skillful play of the skill-based interactive game. The interactive controller 120 can also communicate user choices made in the skill-based interactive game to the application controller 112 included in the application telemetry data 124 such as, but not limited to, the user's utilization of the elements of the skill-based interactive game during the user's skillful play of the skill-based interactive game. In such an embodiment, the application controller is interfaced to the interactive controller 120 in order to allow the coupling of the skill-based interactive game to wagers made in accordance with a wagering proposition.

In some embodiments, the interactive controller 120 includes one or more sensors 138 that sense various aspects of the physical environment of the interactive controller 120. Examples of sensors include, but are not limited to: global positioning sensors (GPSs) for sensing communications from a GPS system to determine a position or location of the interactive controller; temperature sensors; accelerometers; pressure sensors; and the like. Sensor telemetry data 128 is communicated by the interactive controller to the application controller 112. The application controller 112 receives the sensor telemetry data 128 and uses the sensory telemetry data to make wager decisions.

In many embodiments, the interactive controller includes a wagering user interface 148 used to display wagering data to the user.

In various embodiments, an application control layer 131 resident in the interactive controller 120 provides an interface between the interactive controller 120 and the application controller 112.

In many embodiments, application controller 112 provides an interface between the interactive application 143 provided by the interactive controller 120 and a wagering proposition provided by the wager controller 102.

In some embodiments, the application controller 112 includes an interactive controller interface 160 to an interactive controller. The interactive controller interface 160 provides for the communication of data between the interactive controller and the application controller, including but not limited to wager telemetry data 146, application instructions and resources 136, application telemetry data 124, and sensor telemetry data 128.

In various embodiments, the application controller 112 includes a wager controller interface 162 to a wager controller. The wager controller interface 162 provides for communication of data between the application controller 112 and the wager controller, including but not limited to wager outcome data 130 and wager data 129.

In some embodiments, the application controller 112 includes a user management controller interface 164 to a user management controller. The user management controller interface 164 provides for communication of data between the application controller 112 and the user management controller, including but not limited to session control data 154 and session telemetry data 152.

The application controller 112 includes a business rule decision engine 122 that receives telemetry data, such as application telemetry data 124 and sensor telemetry data 128, from the interactive controller 120. The business rule decision engine 122 uses the telemetry data, along with trigger logic 126 to generate wager data 129 used to trigger a wager in the wager controller 102.

In some embodiments, the application telemetry data 124 includes, but is not limited to, application environment variables that indicate the state of the interactive application 143 being used by a user 140, interactive controller data indicating the state of the interactive controller, and user actions and interactions 142 between the user and the interactive application 143 provided by the interactive controller 120. The wagering and/or wager data 129 may include, but is not limited to, an amount and type of the wager, a trigger of the wager, and a selection of a paytable 108 to be used when executing the wager.

In some embodiments, the business rule decision engine 122 also receives wager outcome data 130 from the wager controller 102. The decision engine 122 uses the wager outcome data 130, in conjunction with the telemetry data and application logic 132 to generate application decisions 134 communicated to an application resource generator 138. The application resource generator 138 receives the application decisions and uses the application decisions to generate application instructions and application resources 136 to be communicated to the interactive application 143.

In many embodiments, the application controller 112 includes a pseudo random or random result generator used to generate random results that are communicated to the application resource generator 138. The application resource generator 138 uses the random results to generate application instructions and application resources 136 to be communicated to the interactive application 143.

In various embodiments, the business rule decision engine 122 also determines an amount of AC to award to the user 140 based at least in part on the user's use of the interactive application of the interleaved wagering system as determined from the application telemetry data 124. In some embodiments, wager outcome data 130 may also be used to determine the amount of AC that should be awarded to the user.

In numerous embodiments, the interactive application is a skill-based interactive game and the AC is awarded to the user for the user's skillful play of the skill-based interactive game.

In some embodiments, the application decisions 134 and wager outcome data 130 are communicated to a wagering user interface generator 144. The wagering user interface generator 144 receives the application decisions 134 and wager outcome data 130 and generates wager telemetry data 146 describing the state of wagering and credit accumulation and loss for the interleaved wagering system. In some embodiments, the wager telemetry data 146 may include, but is not limited to, amounts of AC and elements earned, lost or accumulated by the user through use of the interactive application as determined from the application decisions, and RC amounts won, lost or accumulated as determined from the wager outcome data 130 and the one or more meters 110.

In some embodiments, the wager outcome data 130 also includes data about one or more game states of a gambling game executed in accordance with a wagering proposition by the wager controller 102. In various such embodiments, the wagering user interface generator 144 generates a gambling game process display and/or gambling game state display using the one or more game states of the gambling game. The gambling game process display and/or gambling game state display is included in the wager telemetry data 146 that is communicated to the interactive controller 120. The gambling game process display and/or a gambling game state display is displayed by the wagering user interface 148 to the user 140. In other such embodiments, the one or more game states of the gambling game are communicated to the interactive controller 120 and the wagering user interface 148 generates the gambling game process display and/or gambling game state display using the one or more game states of the gambling game for display to the user 140.

The application controller 112 can further operatively connect to the wager controller 102 to determine an amount of credit or elements available and other wagering metrics of a wagering proposition. Thus, the application controller 112 may potentially affect an amount of RC in play for participation in the wagering events of a wagering game provided by the wager controller 102 in some embodiments. The application controller 112 may additionally include various audit logs and activity meters. In some embodiments, the application controller 112 can also couple to a centralized server for exchanging various data related to the user and the activities of the user during game play of an interleaved wagering system.

In many embodiments, one or more users can be engaged in using the interactive application executed by the interactive controller 120. In various embodiments, an interleaved wagering system can include an interactive application that provides a skill-based interactive game that includes head-to-head play between a single user and a computing device, between two or more users against one another, or multiple users playing against a computer device and/or each other. In some embodiments, the interactive application can be a skill-based interactive game where the user is not skillfully playing against the computer or any other user such as skill-based interactive games where the user is effectively skillfully playing against himself or herself.

In some embodiments, the operation of the application controller 112 does not affect the provision of a wagering proposition by the wager controller 102 except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In various embodiments, wager outcome data 130 communicated from the wager controller 102 can also be used to convey a status operation of the wager controller 102.

In a number of embodiments, communication of the wager data 129 between the wager controller 102 and the application controller 112 can further be used to communicate various wagering control factors that the wager controller 102 uses as input. Examples of wagering control factors include, but are not limited to, an amount of RC, AC, elements, or objects consumed per wagering event, and/or the user's election to enter a jackpot round.

In some embodiments, the application controller 112 utilizes the wagering user interface 148 to communicate certain interactive application data to the user, including but not limited to, club points, user status, control of the selection of choices, and messages which a user can find useful in order to adjust the interactive application experience or understand the wagering status of the user in accordance with the wagering proposition in the wager controller 102.

In some embodiments, the application controller 112 utilizes the wagering user interface 148 to communicate aspects of a wagering proposition to the user including, but not limited to, odds of certain wager outcomes, amount of RC, AC, elements, or objects in play, and amounts of RC, AC, elements, or objects available.

In a number of embodiments, the wager controller 102 can accept wager proposition factors including, but not limited to, modifications in the amount of RC, AC, elements, or objects wagered on each individual wagering event, a number of wagering events per minute the wager controller 102 can resolve, entrance into a bonus round, and other factors. An example of a varying wager amount that the user can choose can include, but is not limited to, using a more difficult interactive application level associated with an amount of a wager. These factors can increase or decrease an amount wagered per individual wagering proposition in the same manner that a standard slot machine player can decide to wager more or less credits for each pull of the handle. In several embodiments, the wager controller 102 can communicate a number of factors back and forth to the application controller 112, via an interface, such that an increase/decrease in a wagered amount can be related to the change in user profile of the user in the interactive application. In this manner, a user can control a wager amount per wagering event in accordance with the wagering proposition with the change mapping to a parameter or component that is applicable to the interactive application experience.

In some embodiments, a user management controller 150 is used to authorize an interleaved wagering system gaming session. The user management controller receives game session data 152, that may include, but is not limited to, user, interactive controller, application controller and wager controller data from the application controller 112. The user management controller 150 uses the user, interactive controller, application controller and wager controller data to regulate an interleaved wagering system gaming session. In some embodiments, the user management controller may also assert control of an interleaved wagering system game session 154. Such control may include, but is not limited to, ending an interleaved wagering system game session, initiating wagering in an interleaved wagering system game session, ending wagering in an interleaved wagering system game session but not ending a user's play of the interactive application portion of the interleaved wagering system game, and changing from real credit wagering in an interleaved wagering system to virtual credit wagering, or vice versa.

Interleaved Wagering System Controllers

Figure 2A:
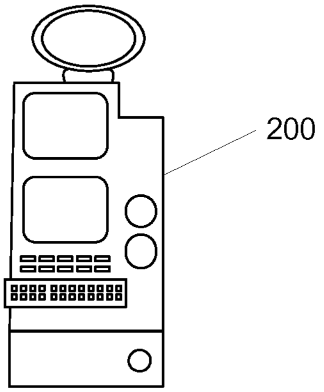
FIGS. 2A, 2B, 2C, and 2D are illustrations of interactive controllers of an interleaved wagering system in accordance with various embodiments of the invention.
Figure 2B:
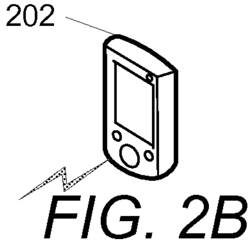
Figure 2C:
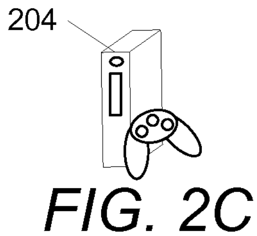
Figure 2D:
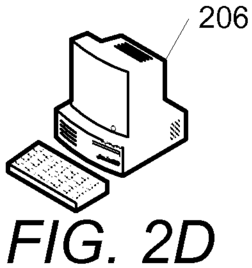

FIGS. 2A, 2B, 2C, and 2D are illustrations of interactive controllers of an interleaved wagering system in accordance with various embodiments of the invention. An interactive controller, such as interactive controller 120 of FIG. 1, may be constructed using one or more processing devices configured to perform the operations of the interactive controller. An interactive controller may be constructed from an electronic gaming machine 200 as shown in FIG. 2A. The electronic gaming machine 200 may be physically located in various types of gaming establishments. An interactive controller may be constructed from a portable device 202 as shown in FIG. 2B. The portable device 202 is a device that may wirelessly connect to a network. Examples of portable devices include, but are not limited to, a tablet computer, a personal digital assistant, and a smartphone. An interactive controller may be constructed from a gaming console 204 as shown in FIG. 2C. An interactive controller may be constructed from a personal computer 206 as shown in FIG. 2D. Indeed, an interactive controller in an interleaved wagering system may be constructed from any processing device including sufficient processing and communication capabilities that may be configured to perform the processes of an interactive controller in accordance with various embodiments of the invention.

Some interleaved wagering systems in accordance with many embodiments of the invention can operate with their components being network connected or can communicate with other interleaved wagering systems. In many embodiments, operations associated with components of an interleaved wagering system can be performed on a single device or across multiple devices. These multiple devices can be constructed using a single server or a plurality of servers such that an interleaved wagering system is executed as a system in a virtualized space such as, but not limited to, where a wager controller and an application controller are large scale centralized servers in the cloud operatively connected to widely distributed interactive controllers via a wide area network such as the Internet or a local area network. In such embodiments, the components of an interleaved wagering system may communicate using a networking protocol or other type of device-to-device communications protocol.

In many embodiments, a centralized wager controller is operatively connected to, and communicates with, one or more application controllers via a network. The centralized wager controller can generate wager outcomes for wagers in accordance with one or more wagering propositions. The centralized wager controller can execute a number of simultaneous or pseudo-simultaneous wagers in order to generate wager outcomes for a variety of wagering propositions that one or more networked interleaved wagering systems can use.

In several embodiments, a centralized application controller is operatively connected to one or more interactive controllers and one or more wager controllers via a network. The centralized application controller can perform the functionality of an application controller across various interleaved wagering systems.

In a variety of embodiments, management of user profile data can be performed by a user management controller operatively connected to, and communicating with, one or more application controllers, wager controllers and interactive controllers via a network. A user management controller can manage data related to a user profile. The managed data in the user profile may include, but is not limited to, data concerning controlled entities (characters) in interactive application use, user performance metrics for a type or class of interactive application, interactive application elements acquired by a user; RC and AC associated with a particular user, and tournament reservations.

Although a user management controller is discussed as being separate from an application controller server, a centralized application controller server may also perform the functions of a user management controller in some embodiments.

In a number of embodiments, an application controller of an interleaved wagering system can communicate data to a user management controller. The data communicated by the application controller to the user management controller may include, but is not limited to, AC and RC used in an interactive application; user profile data; user interaction activity; profile data for users; synchronization data between a wager controller and an interactive application; and data about other aspects of an interleaved wagering system. In several embodiments, a user management controller can communicate user data to an application controller of an interleaved wagering system. The user data may include, but is not limited to, interactive application title and type; tournament data; special offers; character or profile setup and synchronization data between a wagering game and an interactive application; and data about any other aspect of an interleaved wagering system.

In numerous embodiments, an interactive application server provides a host for managing head-to-head play operating over a network of interactive controllers connected to the interactive application server via a network. The interactive application server provides an environment where users can compete directly with one another and interact with other users.

Processing devices connected via a network to construct interleaved wagering systems in accordance with many embodiments of the invention can communicate with each other to provide services utilized by an interleaved wagering system. In several embodiments, a wager controller can communicate with an application controller over a network. In some embodiments, the wager controller can communicate with an application controller to communicate any type of data as appropriate for a specific application. Examples of the data that may be communicated include, but are not limited to, data used to configure the various simultaneous or pseudo simultaneous wager controllers executing in parallel within the wager controller to accomplish interleaved wagering system functionalities; data used to determine metrics of wager controller performance such as wagers run and/or wager outcomes for tracking system performance;

data used to perform audits and/or provide operator reports; and data used to request the results of a wager outcome for use in one or more function(s) operating within the application controller such as, but not limited to, automatic drawings for prizes that are a function of interactive controller performance.

In several embodiments, an application controller can communicate with an interactive application server via a network when the interactive application server is also communicating with one or more interactive controllers over a network. An application controller can communicate with an interactive application server to communicate any type of data as appropriate for a specific application. The data that may be communicated between an application controller and an interactive application server includes, but is not limited to, the data for management of an interactive application server by an application controller server during an interleaved wagering system tournament. For example, an application controller may not be aware of the relationship of the application controller to the rest of a tournament since the actual tournament play may be managed by the interactive application server. Therefore, management of an interleaved wagering system can include, but is not limited to tasks including, but not limited to, conducting tournaments according to system programming that can be coordinated by an operator of the interleaved wagering system; allowing entry of a particular user into a tournament; communicating the number of users in a tournament; and the status of the tournament (such as, but not limited to the amount of surviving users, the status of each surviving user within the game, and time remaining on the tournament); communicating the performance of users within the tournament; communicating the scores of the various users in the tournament; and providing a synchronizing link to connect the application controllers in a tournament with their respective interactive controllers.

In several embodiments, an application controller can communicate with a user management controller via a network. An application controller can communicate with a user management controller to communicate any type of data as appropriate for a specific application. Examples of data communicated between an application controller and a user management controller include, but are not limited to, data for configuring tournaments according to system programming conducted by an operator of an interleaved wagering system; data for exchange of data used to link a user's user profile to an ability to participate in various forms of interleaved wagering system use (such as but not limited to the difficulty of play set by the application controller server for an interactive application that is a skill-based interactive game); data for determining a user's ability to participate in a tournament as a function of a user's characteristics (such as but not limited to a user's prowess or other metrics used for tournament screening); data for configuring application controller and interactive controller performance to suit preferences of a user on a particular interleaved wagering system; and data for determining a user's use and wagering performance for the purposes of marketing intelligence; and data for logging secondary drawing awards, tournament prizes, RC and/or AC into the user profile.

In many embodiments, the actual location of where various process are executed can be located either on a single device (wager controller, application controller, interactive controller), on servers (wager controller, application controller, or interactive application server), or a combination of both devices and servers. In a number of embodiments, certain functions of a wager controller, application controller, user management controller and/or interactive application server can operate on a local wager controller, application controller and/or interactive controller used to construct an interleaved wagering system being provided locally on a device. In some embodiments, a controller or server can be part of a server system including multiple servers, where applications can be run on one or more physical devices. Similarly, in particular embodiments, multiple servers can be combined on a single physical device.

Figure 3A:
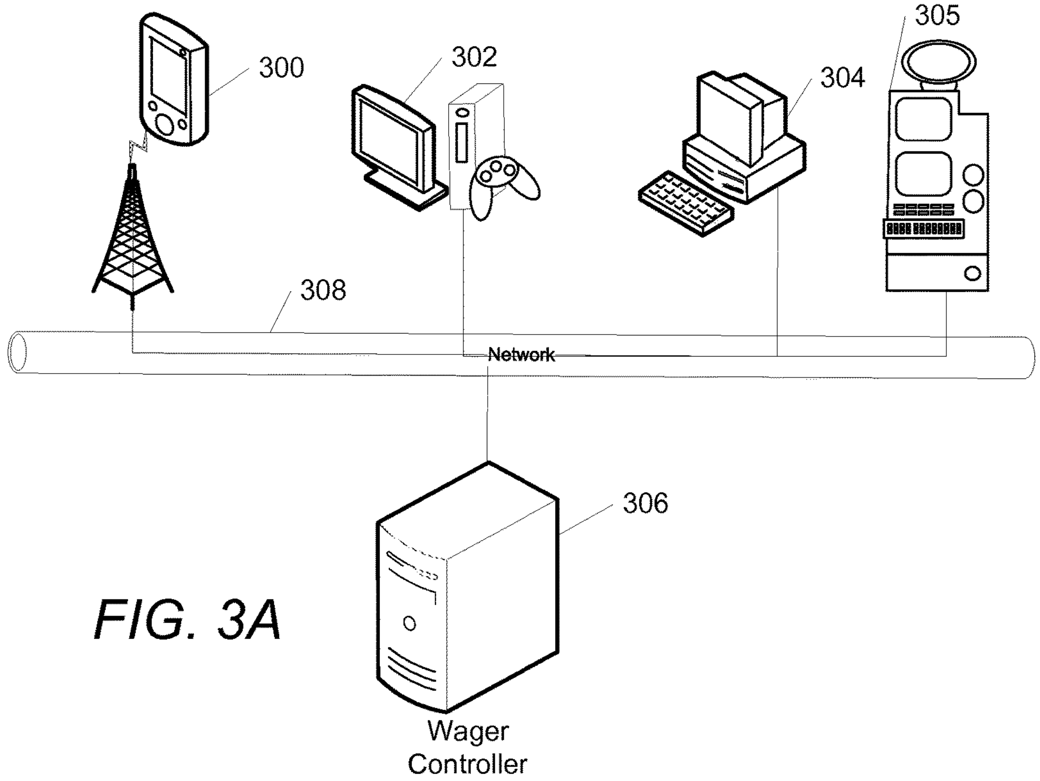
FIGS. 3A, 3B and 3C are network diagrams of distributed interleaved wagering systems in accordance with various embodiments of the invention.
Figure 3B:
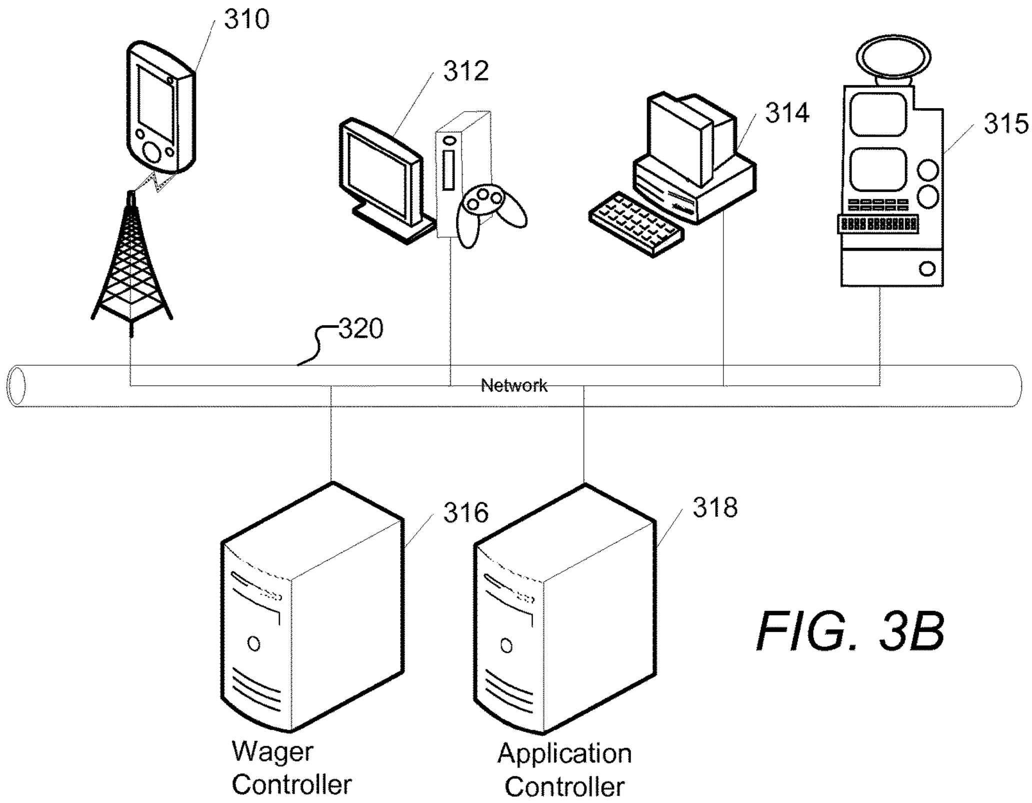
Figure 3C:
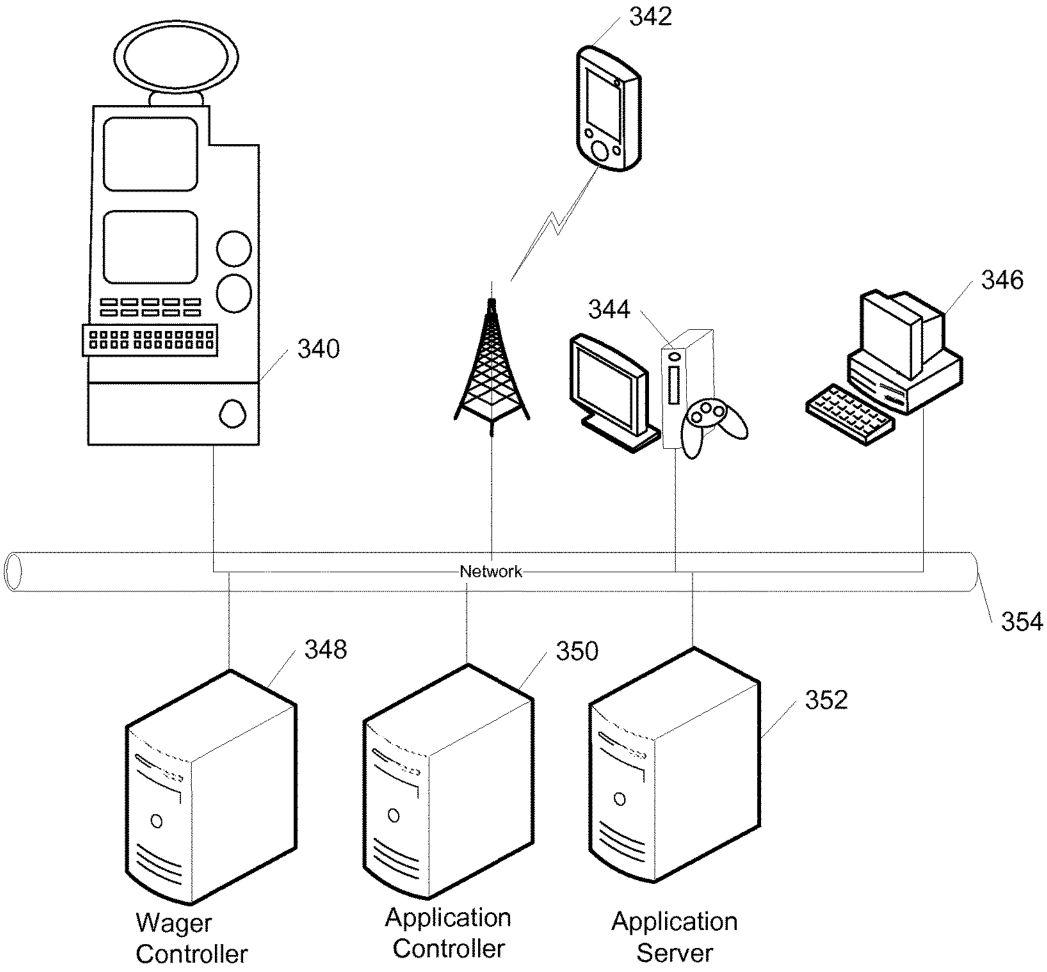

Some interleaved wagering systems in accordance with many embodiments of the invention can be distributed across a network in various configurations. FIGS. 3A, 3B and 3C are network diagrams of networked interleaved wagering systems in accordance with various embodiments of the invention. Turning now to FIG. 3A, one or more interactive controllers of a networked interleaved wagering system, such as but not limited to, a mobile or wireless device 300, a gaming console 302, a personal computer 304, and an electronic gaming machine 305, are operatively connected with a wager controller 306 of a networked interleaved wagering system over a network 308. Network 308 is communications network that allows processing systems communicate with each other and to share data. Examples of the network 308 can include, but are not limited to, a Local Area Network (LAN) and a Wide Area Network (WAN). In some embodiments, one or more processes of an interactive controller and an application controller as described herein are executed on the individual interactive controllers 300, 302, 304 and 305 while one or more processes of a wager controller as described herein can be executed by the wager controller 306.

A networked interleaved wagering system in accordance with another embodiment of the invention is illustrated in FIG. 3B. As illustrated, one or more interactive controllers of a networked interleaved wagering system, such as but not limited to, a mobile or wireless device 310, a gaming console 312, a personal computer 314, and an electronic gaming machine 315, are operatively connected with a wager controller server 316 and an application controller 318 over a network 320. Network 320 is a communications network that allows processing systems to communicate and share data. Examples of the network 320 can include, but are not limited to, a Local Area Network (LAN) and a Wide Area Network (WAN). In some embodiments, the processes of an interactive controller as described herein are executed on the individual interactive controllers 310, 312, 314 and 315. One or more processes of a wager controller as described herein are executed by the wager controller 316, and one or more processes of an application controller as described herein are executed by the application controller 318.

A networked interleaved wagering systems in accordance with still another embodiment of the invention is illustrated in FIG. 3C. As illustrated, one or more interactive controllers of a networked interleaved wagering system, such as but not limited to, a mobile device 342, a gaming console 344, a personal computer 346, and an electronic gaming machine 340 are operatively connected with a wager controller 348 and an application controller 350, and an interactive application server 352 over a network 354. Network 354 is a communications network that allows processing systems communicate and to share data. Examples of the network 354 can include, but are not limited to, a Local Area Network (LAN) and a Wide Area Network (WAN). In some embodiments, one or more processes of a display and user interface of an interactive controller as described herein are executed on the individual interactive controllers 340, 342, 344 and 346. One or more processes of a wager controller as described herein can be executed by the wager controller server 348. One or more processes of an application controller as described herein can be executed by the application controller server 350 and one or more processes of an interactive controller excluding the display and user interfaces can be executed by the interactive application server 352.

In various embodiments, a user management controller may be operatively connected to components of an interleaved wagering system via a network. In other embodiments, a number of other peripheral systems, such as a user management system, a gaming establishment management system, a regulatory system, and/or hosting servers are also operatively connected with the interleaved wagering systems over a network. Also, other servers can reside outside the bounds of a network within a firewall of the operator to provide additional services for network connected interleaved wagering systems.

Although various networked interleaved wagering systems are described herein, interleaved wagering systems can be networked in any configuration as appropriate to the specification of a specific application in accordance with embodiments of the invention. In some embodiments, components of a networked interleaved wagering system, such as an application controller, wager controller, interactive controller, or other servers that perform services for an application controller, wager controller and/or interactive controller, can be networked in different configurations for a specific networked interleaved wagering system application.

Figure 4A:
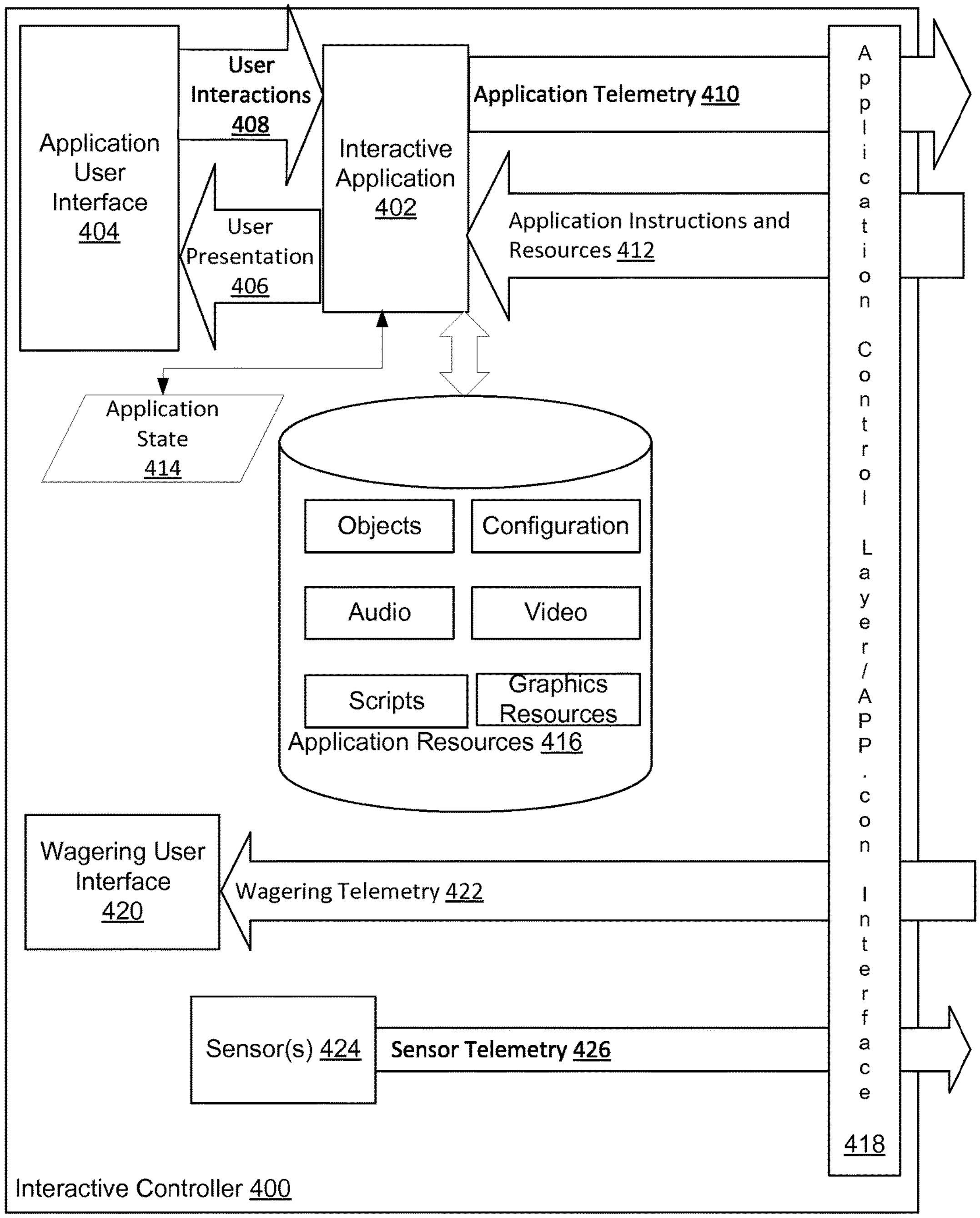
FIGS. 4A and 4B are diagrams of a structure of an interactive controller of an interleaved wagering system in accordance with various embodiments of the invention.
Figure 4B:
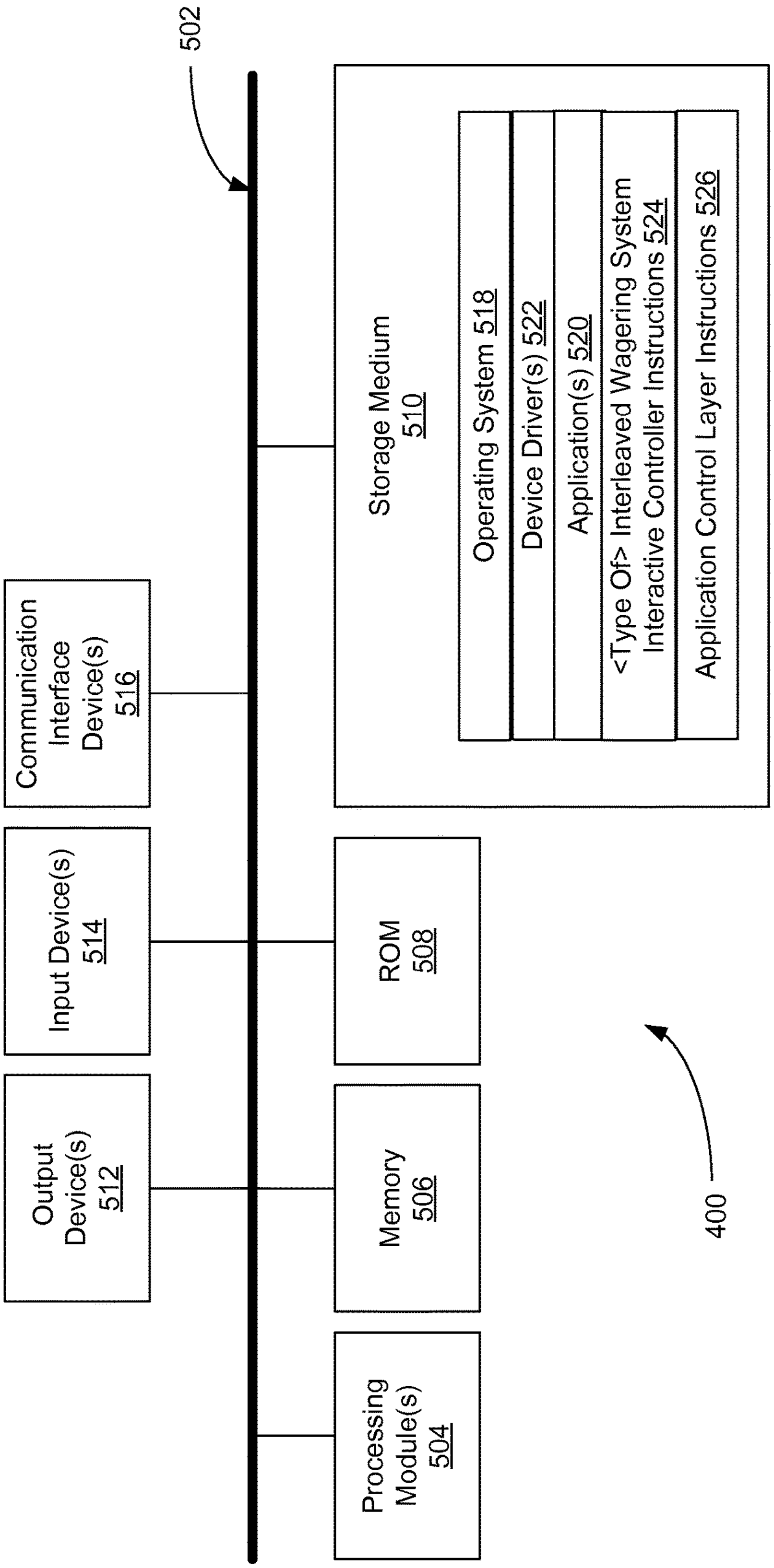

FIGS. 4A and 4B are diagrams of a structure of an interactive controller of an interleaved wagering system in accordance with various embodiments of the invention. An interactive controller may be constructed from one or more processing devices configured to perform the operations of the interactive controller. In many embodiments, an interactive controller can be constructed from various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 4A, an interactive controller 400, suitable for use as interactive controller 120 of FIG. 1, provides an execution environment for an interactive application 402 of an interleaved wagering system. In several embodiments, an interactive controller 400 of an interleaved wagering system provides an interactive application 402 that generates an application user interface 404 for interaction with by a user. The interactive application 402 generates a user presentation 406 that is presented to the user through the application user interface 404. The user presentation may include audio features, visual features or tactile features, or any combination of these features. The application user interface 404 further includes one or more human input devices (HIDs) that the user can use to interact with the interleaved wagering system. The user's interactions 408 are included by the interactive application 402 in application telemetry data 410 that is communicated by interactive controller 400 to various other components of an interleaved wagering system as described herein. The interactive application 402 receives application instructions and resources 412 communicated from various other components of an interleaved wagering system as described herein.

In some embodiments, various components of the interactive application 402 can read data from an application state 414 in order to provide one or more features of the interactive application. In various embodiments, components of the interactive application 402 can include, but are not limited to, a physics engine, a rules engine, and/or a graphics engine. The physics engine is used to simulate physical interactions between virtual objects in the interactive application 402. The rules engine implements the rules of the interactive application and a P/RNG that may be used for influencing or determining certain variables and/or outcomes to provide a randomizing influence on the operations of the interactive application. The graphics engine is used to generate a visual representation of the interactive application state to the user. Furthermore, the components may also include an audio engine to generate audio outputs for the user interface.

During operation, the interactive application reads and writes application resources 416 stored on a data store of the interactive controller host. The game resources 416 may include game objects having graphics and/or control logic used to provide application environment objects of the interactive application. In various embodiments, the game resources may also include, but are not limited to, video files that are used to generate a portion of the user presentation 406; audio files used to generate music, sound effects, etc. within the interactive application; configuration files used to configure the features of the interactive application; scripts or other types of control code used to provide various features of the interactive application; and graphics resources such as textures, objects, etc. that are used by a graphics engine to render objects displayed in an interactive application.

In operation, components of the interactive application 402 read portions of the application state 414 and generate the user presentation 406 for the user that is presented to the user using the user interface 212. The user perceives the user presentation and provides user interactions 408 using the HIDs. The corresponding user interactions are received as user actions or inputs by various components of the interactive application 402. The interactive application 402 translates the user actions into interactions with the virtual objects of the application environment stored in the application state 414. Components of the interactive application use the user interactions with the virtual objects of the interactive application and the interactive application state 414 to update the application state 414 and update the user presentation 406 presented to the user. The process loops continuously while the user interacts with the interactive application of the interleaved wagering system.

The interactive controller 400 provides one or more interfaces 418 between the interactive controller 400 and other components of an interleaved wagering system, such as, but not limited to, an application controller. The interactive controller 400 and the other interleaved wagering system components communicate with each other using the interfaces. The interface may be used to pass various types of data, and to communicate and receive messages, status data, commands and the like. In certain embodiments, the interactive controller 400 and an application controller communicate application instructions and environment resources 412 and application telemetry data 410. In some embodiments, the communications include requests by the application controller that the interactive controller 400 update the application state 414 using data provided by the application controller.

In many embodiments, a communication by an application controller include a request that the interactive controller 400 update one or more resources 416 using data provided by the application controller. In a number of embodiments, the interactive controller 400 provides all or a portion of the application state to the application controller. In some embodiments, the interactive controller 400 may also provide data about one or more of the application resources 416 to the application controller. In some embodiments, the communication includes user interactions that the interactive controller 400 communicates to the application controller. The user interactions may be low level user interactions with the user interface 404, such as manipulation of a HID, or may be high level interactions with game objects as determined by the interactive application. The user interactions may also include resultant actions such as modifications to the application state 414 or game resources 416 resulting from the user's interactions taken in the interleaved wagering system interactive application. In some embodiments, user interactions include, but are not limited to, actions taken by entities such as non-player characters (NPC) of the interactive application that act on behalf of or under the control of the user.

In some embodiments, the interactive controller 400 includes an interleaved wagering system user interface 420 used to communicate interleaved wagering system telemetry data 422 to and from the user. The interleaved wagering system telemetry data 422 from the interleaved wagering system include, but are not limited to, data used by the user to configure RC, AC and element wagers, and data about the wagering game RC, AC and element wagers such as, but not limited to, RC, AC and element balances and RC, AC and element amounts wagered.

In some embodiments, the interactive controller includes one or more sensors 424. Such sensors may include, but are not limited to, physiological sensors that monitor the physiology of the user, environmental sensors that monitor the physical environment of the interactive controller, accelerometers that monitor changes in motion of the interactive controller, and location sensors that monitor the location of the interactive controller such as global positioning sensors (GPSs). The interactive controller 400 communicates sensor telemetry data 426 to one or more components of the interleaved wagering system.

Referring now to FIG. 4B, interactive controller 400 includes a bus 502 that provides an interface for one or more processing modules 504, random access memory (RAM) 506, read only memory (ROM) 508, machine-readable storage medium 510, one or more user output devices 512, one or more user input devices 514, and one or more communication interface devices 516.

The one or more processing modules 504 may take many forms, such as, but not limited to: one or more processors; a central processing unit (CPU); a multi-processor unit (MPU); an ARM processor; a controller; a programmable logic device; or the like.

Examples of output devices 512 include, but are not limited to, display screens; light panels; and/or lighted displays. In accordance with particular embodiments, the one or more processing modules 504 are operatively connected to audio output devices such as, but not limited to: speakers; and/or sound amplifiers. In accordance with many of these embodiments, the one or more processing modules 504 are operatively connected to tactile output devices like vibrators, and/or manipulators.

Examples of user input devices 514 include, but are not limited to: tactile devices including but not limited to, keyboards, keypads, foot pads, touch screens, and/or trackballs; non-contact devices such as audio input devices; motion sensors and motion capture devices that the interactive controller can use to receive inputs from a user when the user interacts with the interactive controller; physiological sensors that monitor the physiology of the user; environmental sensors that monitor the physical environment of the interactive controller; accelerometers that monitor changes in motion of the interactive controller; and location sensors that monitor the location of the interactive controller such as global positioning sensors.

The one or more communication interface devices 516 provide one or more wired or wireless interfaces for communicating data and commands between the interactive controller 400 and other devices that may be included in an interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface, a cellular or satellite telephone network interface; and the like.

The machine-readable storage medium 510 stores machine-executable instructions for various components of the interactive controller, such as but not limited to: an operating system 518; one or more device drivers 522; one or more application programs 520 including but not limited to an interactive application; and interleaved wagering system interactive controller instructions 524 for use by the one or more processing modules 504 to provide the features of an interactive controller as described herein. In some embodiments, the machine-executable instructions further include application control layer/application control interface instructions 526 for use by the one or more processing modules 504 to provide the features of an application control layer/application control interface as described herein.

In various embodiments, the machine-readable storage medium 510 is one of a (or a combination of two or more of) a hard drive, a flash drive, a DVD, a CD, a flash storage, a solid state drive, a ROM, an EEPROM, and the like.

In operation, the machine-executable instructions are loaded into memory 506 from the machine-readable storage medium 510, the ROM 508 or any other storage location. The respective machine-executable instructions are accessed by the one or more processing modules 504 via the bus 502, and then executed by the one or more processing modules 504. Data used by the one or more processing modules 504 are also stored in memory 506, and the one or more processing modules 504 access such data during execution of the machine-executable instructions. Execution of the machine-executable instructions causes the one or more processing modules 504 to control the interactive controller 400 to provide the features of an interleaved wagering system interactive controller as described herein Although the interactive controller is described herein as being constructed from one or more processing modules and instructions stored and executed by hardware components, the interactive controller can be constructed of only hardware components in accordance with other embodiments. In addition, although the storage medium 510 is described as being operatively connected to the one or more processing modules through a bus, those skilled in the art of interactive controllers will understand that the storage medium can include removable media such as, but not limited to, a USB memory device, an optical CD ROM, magnetic media such as tape and disks. In some embodiments, the storage medium 510 can be accessed by the one or more processing modules 504 through one of the communication interface devices 516 or over a network. Furthermore, any of the user input devices or user output devices can be operatively connected to the one or more processing modules 504 via one of the communication interface devices 516 or over a network.

In some embodiments, the interactive controller 400 can be distributed across a plurality of different devices. In many such embodiments, an interactive controller of an interleaved wagering system includes an interactive application server operatively connected to an interactive client over a network. The interactive application server and interactive application client cooperate to provide the features of an interactive controller as described herein.

In various embodiments, the interactive controller 400 may be used to construct other components of an interleaved wagering system as described herein.

In some embodiments, components of an interactive controller and an application controller of a wagering interleaved system may be constructed from a single device using processes that communicate using an interprocess communication protocol. In other such embodiments, the components of an interactive controller and an application controller of a wagering interleaved system may communicate by passing messages, parameters or the like.

In some embodiments, components of an interactive controller, an application controller and a wager controller of a wagering interleaved system may be constructed using a single device using processes that communicate using an interprocess communication protocol. In other such embodiments, the components of an interactive controller, an application controller and a wager controller of a wagering interleaved system may communicate by passing messages, parameters or the like.

Figure 5A:
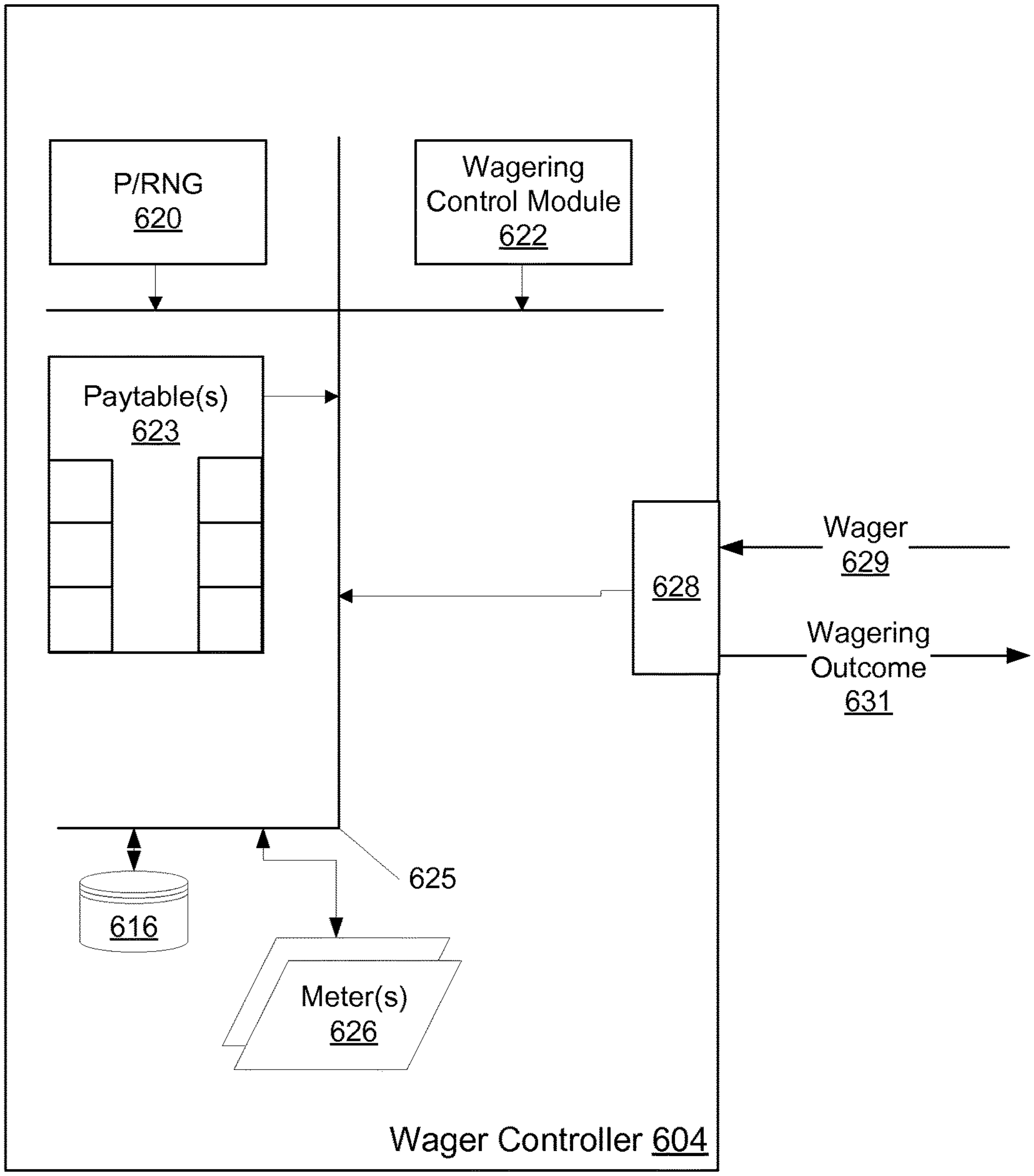
FIGS. 5A and 5B are diagrams of a structure of a wager controller of an interleaved wagering system in accordance with various embodiments of the invention.
Figure 5B:
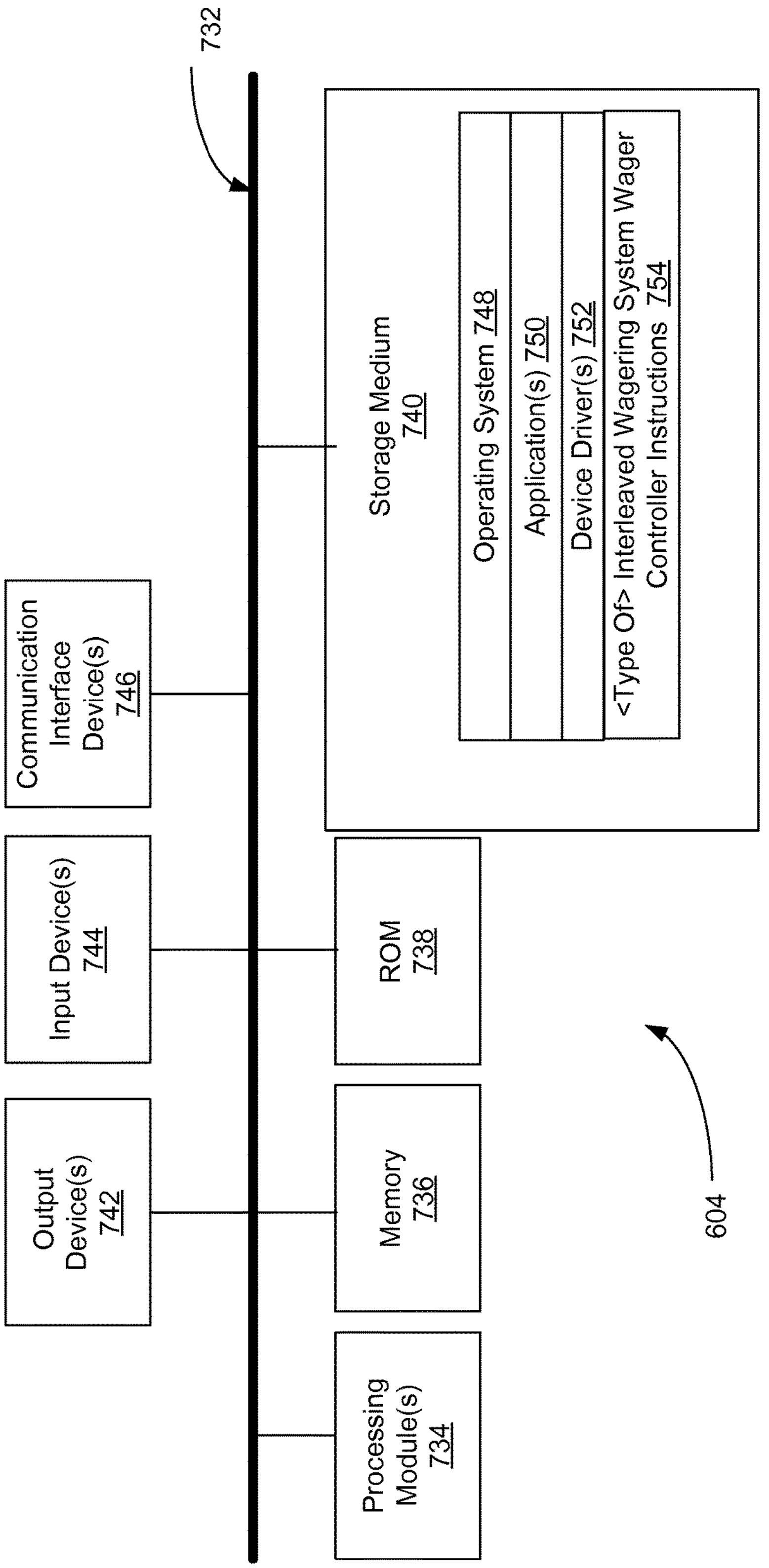

FIGS. 5A and 5B are diagrams of a structure of a wager controller of an interleaved wagering system in accordance with various embodiments of the invention. A wager controller may be constructed from one or more processing devices configured to perform the operations of the wager controller. In many embodiments, a wager controller can be constructed from various types of processing devices including, but not limited to, a mobile device such as a smartphone or the like, a personal digital assistant, a wireless device such as a tablet computer or the like, an electronic gaming machine, a personal computer, a gaming console, a set-top box, a computing device, a controller, or the like.

Referring now to FIG. 5A, in various embodiments, a wager controller 604, suitable for use as wager controller 102 of FIG. 1, includes a pseudorandom or random number generator (P/RNG) 620 to produce random results or pseudo random results; one or more paytables 623 which includes a plurality of factors indexed by the random result to be multiplied with an amount of RC, AC, elements, or objects committed in a wager; and a wagering control module 622 whose processes may include, but are not limited to, generating random results, looking up factors in the paytables, multiplying the factors by an amount of RC, AC, elements, or objects wagered, and administering one or more RC, AC, element, or object meters 626. The various wager controller components can interface with each other via an internal bus 625 and/or other appropriate communication mechanism.

An interface 628 allows the wager controller 604 to operatively connect to an external device, such as one or more application controllers as described herein. The interface 628 provides for receiving of wager data 629 from the external device that is used to specify wager parameters and/or trigger execution of a wager by the wager controller 604. The interface 628 may also provide for communicating wager outcome data 631 to an external device. In numerous embodiments, the interface between the wager controller 604 and other systems/devices may be a wide area network (WAN) such as the Internet. However, other methods of communication may be used including, but not limited to, a local area network (LAN), a universal serial bus (USB) interface, and/or some other method by which two electronic devices could communicate with each other.

In various embodiments, a wager controller 604 may use a P/RNG provided by an external system. The external system may be connected to the wager controller 604 by a suitable communication network such as a local area network (LAN) or a wide area network (WAN). In some embodiments, the external P/RNG is a central deterministic system that provides random or pseudo random results to one or more connected wager controllers.

During operation of the wager controller, the external system communicates wager data 629 to the wager controller 604. The wager controller 604 receives the wager data and uses the wager data to trigger execution of a wager in accordance with a wagering proposition. The wager controller 604 executes the wager and determines a wager outcome for the wager. The wager controller communicates wager outcome data 631 of the wager outcome to the external system.

In some embodiments, the wager controller uses the wager data to select a paytable 628 to use and/or an amount of RC, AC, elements, or objects to wager.

In some embodiments, the wager outcome data may include, but is not limited to, an amount of RC, AC, elements, or objects won in the wager.

In various embodiments, the wager outcome data may include, but is not limited to, an amount of RC, AC, elements, or objects in the one or more meters 626.

In some embodiments, the wager outcome data includes state data for the wagering proposition of the executed wager. The state data may correspond to one or more game states of a gambling game that is associated with the wagering proposition. Examples of state data include, but are not limited to, reel strips in an operation state or a final state for a reel-based gambling game, one or more dice positions for a dice-based gambling game, positions of a roulette wheel and roulette ball, position of a wheel of fortune, or the like.

In various embodiments, the wagering control module 622 determines an amount of a wager and a paytable to use from the one or more paytables 623. In such embodiments, in response to the wager data triggering execution of the wager, the wager control module 622 executes the wager by requesting a P/RNG result from the P/RNG 620; retrieving a paytable from the one or more paytables 623; adjusting the one or more credit meters 626 for an amount of the wager; applying the P/RNG result to the retrieved paytable; multiplying the resultant factor from the paytable by an amount wagered to determine a wager outcome; updating the one or more meters 626 based on the wager outcome; and communicating the wager outcome to the external device.

In various embodiments, an external system communicates a request for a P/RNG result from the wager controller 604. In response, the wager controller 604 returns a P/RNG result as a function of an internal P/RNG or a P/RNG external to the external system to which the wager controller 604 is operatively connected.

In some embodiments, a communication exchange between the wager controller 604 and an external system relate to the external system support for coupling a P/RNG result to a particular paytable contained in the wager controller 604. In such an exchange, the external system communicates to the wager controller 604 as to which of the one or more paytables 623 to use, and requests a result whereby the P/RNG result would be associated with the requested paytable 623. The result of the coupling is returned to the external system. In such an exchange, no actual RC, AC, element, or object wager is conducted, but might be useful in coupling certain non-value wagering interactive application behaviors and propositions to the same final resultant wagering return which is understood for the interleaved wagering system to conduct wagering.

In some embodiments, the wager controller 604 may also include storage for statuses, wagers, wager outcomes, meters and other historical events in a storage device 616.

In some embodiments, an authorization access module provides a process to permit access and command exchange with the wager controller 604 and access to the one or more credit meters 626 for the amount of RC, AC, elements, or objects being wagered by the user in the interleaved wagering system.

In numerous embodiments, communication occurs between various types of a wager controller and an external system 630, such as application controller. In some of these embodiments, the purpose of the wager controller is to allocate wagers to pools, detect occurrences of one or more events upon which the wagers were made, and determine the wager outcomes for each individual wager based on the number of winning wagers and the amount paid into the pool.

In some embodiments, the wager controller manages accounts for individual users wherein the users make deposits into the accounts, amounts are deducted from the accounts, and amounts are credited to the users' accounts based on the wager outcomes.

In some embodiments a wager controller is a pari-mutuel wagering system such as used for wagering on an events such as horse races, greyhound races, sporting events and the like. In a pari-mutuel wagering system, user's wagers on the outcome of an event are allocated to a pool. When the event occurs, wager outcomes are calculated by sharing the pool among all winning wagers.

In various embodiments, a wager controller is a central determination system, such as but not limited to a central determination system for a Class II wagering system or a wagering system in support of a "scratch off" style lottery. In such a wagering system, a player plays against other players and competes for a common prize. In a given set of wager outcomes, there are a certain number of wins and losses. Once a certain wager outcome has been determined, the same wager outcome cannot occur again until a new set of wager outcomes is generated.

In numerous embodiments, communication occurs between various components of a wager controller 604 and an external system, such as an application controller. In some of these embodiments, the purpose of the wager controller 604 is to manage wagering on wagering events and to provide random (or pseudo random) results from a P/RNG.

Referring now to FIG. 5B, wager controller 604 includes a bus 732 that provides an interface for one or more processing modules 734, random access memory (RAM) 736, read only memory (ROM) 738, machine-readable storage medium 740, one or more user output devices 742, one or more user input devices 744, and one or more network interface devices 746.

The one or more processing modules 734 may take many forms, such as, but not limited to, one or more processors, a central processing unit (CPU), a multi-processor unit (MPU), an ARM processor, a controller, a programmable logic device, or the like.

Examples of output devices 742 include, but are not limited to, display screens, light panels, and/or lighted displays. In accordance with particular embodiments, the one or more processing modules 734 are operatively connected to audio output devices such as, but not limited to speakers, and/or sound amplifiers. In accordance with many of these embodiments, the one or more processing modules 734 are operatively connected to tactile output devices like vibrators, and/or manipulators.

Examples of user input devices 734 include, but are not limited to, tactile devices including but not limited to, keyboards, keypads, touch screens, and/or trackballs; non-contact devices such as audio input devices; motion sensors and motion capture devices that the wager controller can use to receive inputs from a user when the user interacts with the wager controller 604.

The one or more network interface devices 746 provide one or more wired or wireless interfaces for exchanging data and commands between the wager controller 604 and other devices that may be included in an interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface; a cellular or satellite telephone network interface; and the like.

The machine-readable storage medium 740 stores machine-executable instructions for various components of a wager controller, such as but not limited to: an operating system 748; one or more application programs 750; one or more device drivers 752; and interleaved wagering system wager controller instructions 754 for use by the one or more processing modules 734 to provide the features of an interleaved wagering system wager controller as described herein.

In various embodiments, the machine-readable storage medium 740 is one of a (or a combination of two or more of) a hard drive, a flash drive, a DVD, a CD, a flash storage, a solid state drive, a ROM, an EEPROM, and the like.

In operation, the machine-executable instructions are loaded into memory 736 from the machine-readable storage medium 740, the ROM 738 or any other storage location. The respective machine-executable instructions are accessed by the one or more processing modules 734 via the bus 732, and then executed by the one or more processing modules 734. Data used by the one or more processing modules 734 are also stored in memory 736, and the one or more processing modules 734 access such data during execution of the machine-executable instructions. Execution of the machine-executable instructions causes the one or more processing modules 734 to control the wager controller 604 to provide the features of an interleaved wagering system wager controller as described herein Although the wager controller 604 is described herein as being constructed from one or more processing modules and machine-executable instructions stored and executed by hardware components, the wager controller can be composed of only hardware components in accordance with other embodiments. In addition, although the storage medium 740 is described as being operatively connected to the one or more processing modules through a bus, those skilled in the art of processing devices will understand that the storage medium can include removable media such as, but not limited to, a USB memory device, an optical CD ROM, magnetic media such as tape and disks. In some embodiments, the storage medium 740 can be accessed by the one or more processing modules 734 through one of the interfaces or over a network. Furthermore, any of the user input devices or user output devices can be operatively connected to the one or more processing modules 734 via one of the interfaces or over a network.

In various embodiments, the wager controller 604 may be used to construct other components of an interleaved wagering system as described herein.

In some embodiments, components of a wager controller and an application controller of a wagering interleaved system may be constructed from a single device using processes that communicate using an interprocess communication protocol. In other such embodiments, the components of a wager controller and an application controller of a wagering interleaved system may communicate by passing messages, parameters or the like.

It should be understood that there may be many embodiments of a wager controller 604 which could be possible, including forms where many modules and components of the wager controller are located in various servers and locations, so the foregoing is not meant to be exhaustive or all inclusive, but rather provide data on various embodiments of a wager controller 604.

Figure 6A:
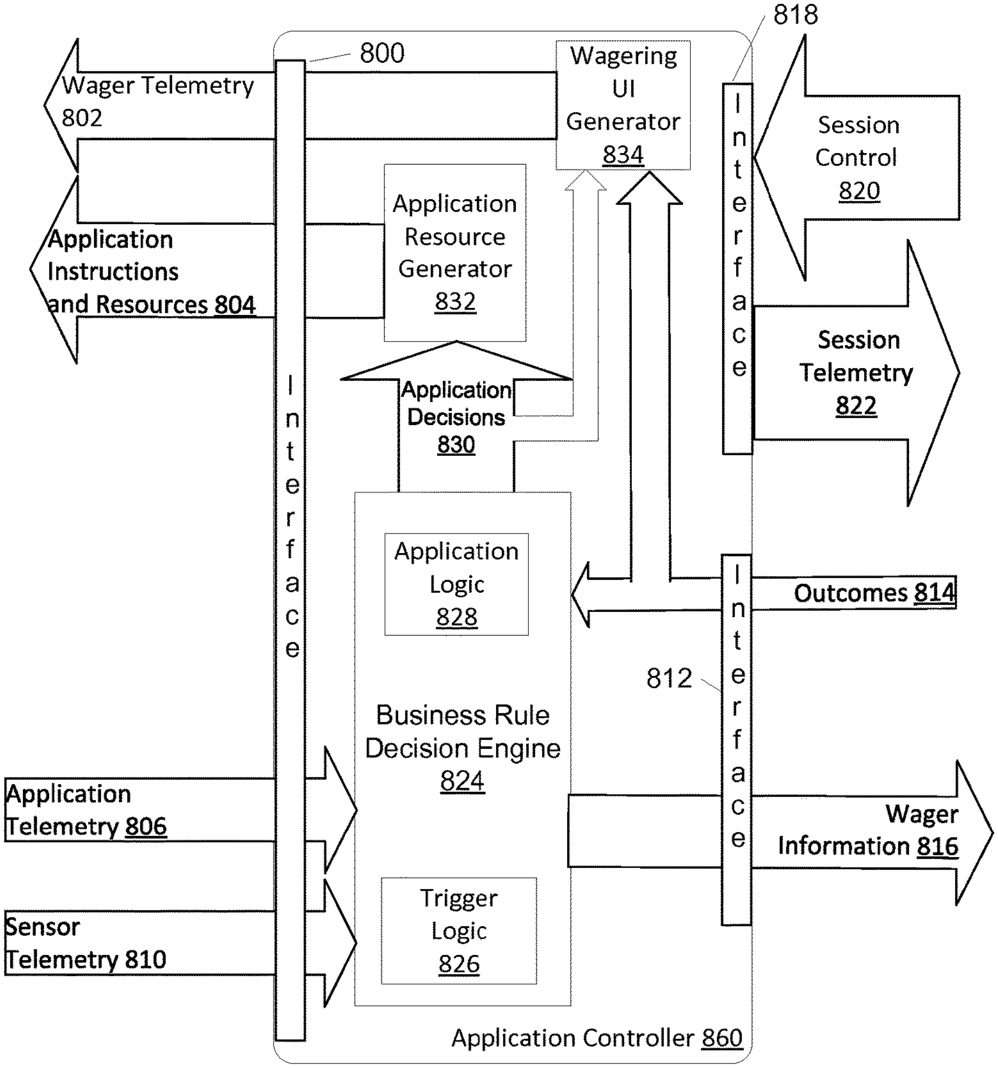
FIGS. 6A and 6B are diagrams of a structure of an application controller of an interleaved wagering system in accordance with various embodiments of the invention.
Figure 6B:
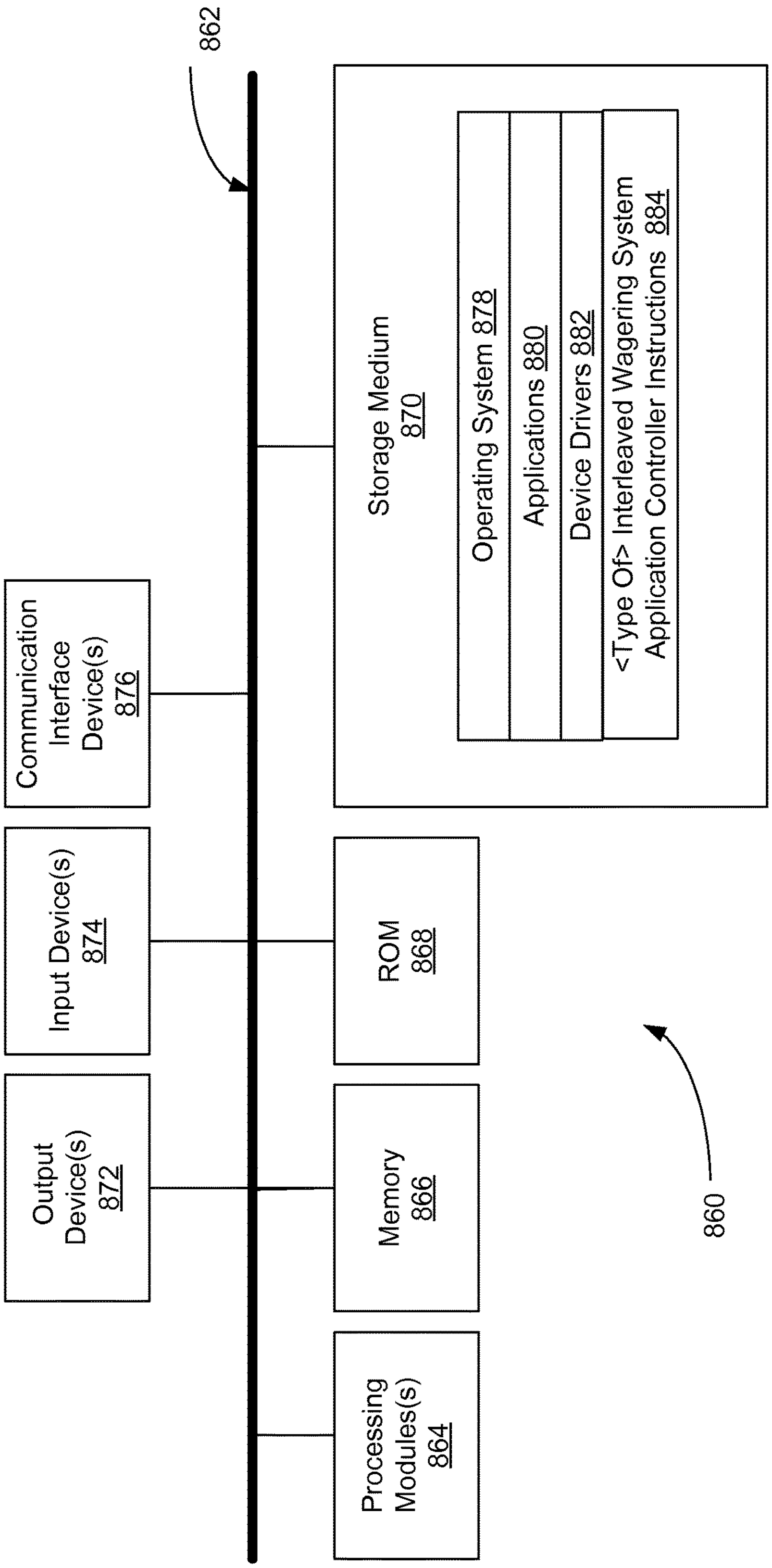

FIGS. 6A and 6B are diagrams of a structure of an application controller of an interleaved wagering system in accordance with various embodiments of the invention. An application controller may be constructed from one or more processing devices configured to perform the operations of the application controller. In many embodiments, an application controller can be constructed from various types of processing devices including, but not limited to, a mobile device such as a smartphone, a personal digital assistant, a wireless device such as a tablet computer or the like, an electronic gaming machine, a personal computer, a gaming console, a set-top box, a computing device, a controller, or the like.

Referring now to FIG. 6A, in many embodiments, an application controller 860, suitable for use as application controller 112 of FIG. 1, manages operation of an interleaved wagering system, with a wager controller and an interactive controller being support units to the application controller 860. The application controller 860 provides an interface between the interactive application, provided by an interactive controller, and a wagering proposition, provided by a wager controller.

In some embodiments, the application controller 860 includes an interactive controller interface 800 to an interactive controller. The interactive controller interface 800 provides for communication of data between an interactive controller and the application controller 860, including but not limited to wager telemetry data 802, application instructions and resources 804, application telemetry data 806, and sensor telemetry data 810.

In various embodiments, the application controller 860 includes a wager controller interface 812 to a wager controller. The wager controller interface 812 provides for communication of data between the application controller 860 and a wager controller, including but not limited to wager outcomes 814 and wager data 816.

In some embodiments, the application controller 860 includes a user management controller interface 818 to a user management controller. The user management controller interface 818 provides for communication of data between the application controller 860 and a user management controller, including but not limited to session control data 820 and session telemetry data 822.

The application controller 860 includes a business rule decision engine 824 that receives telemetry data, such as application telemetry data and sensor telemetry data, from an interactive controller. The business rule decision engine 824 uses the telemetry data, along with trigger logic 826 to generate wager data used to trigger a wager in a wager controller.

In some embodiments, the application telemetry data includes, but is not limited to, application environment variables that indicate the state of an interactive application being used by a user, interactive controller data indicating a state of an interactive controller, and user actions and interactions between a user and an interactive application provided by an interactive controller. The wagering and/or wager data may include, but is not limited to, an amount and type of the wager, a trigger of the wager, and a selection of a paytable to be used when executing the wager.

In some embodiments, the business rule decision engine 824 also receives wager outcome data from a wager controller. The decision engine 824 uses the wager outcome data, in conjunction with telemetry data and application logic 828 to generate application decisions 830 communicated to an application resource generator 832. The application resource generator 832 receives the application decisions and uses the application decisions to generate application instructions and application resources to be communicated to an interactive application.

In many embodiments, the application controller 860 includes a pseudo random or random result generator used to generate random results that are communicated to the application resource generator 832. The application resource generator uses the random results to generate application instructions and application resources to be communicated to an interactive controller for use by an interactive application.

In various embodiments, the business rule decision engine 824 also determines an amount of AC to award to a user based at least in part on the user's use of an interactive application of the interleaved wagering system as determined from application telemetry data. In some embodiments, wager outcome data may also be used to determine the amount of AC that should be awarded to the user.

In numerous embodiments, an interactive application is a skill-based interactive game and the AC is awarded to the user for the user's skillful play of the skill-based interactive game.

In some embodiments, the application decisions and wager outcome data are communicated to a wagering user interface generator 834. The wagering user interface generator 834 receives the application decisions and wager outcome data and generates wager telemetry data describing the state of wagering and credit accumulation and loss for the interleaved wagering system. In some embodiments, the wager telemetry data 146 may include, but is not limited to, amounts of AC and elements earned, lost or accumulated by the user through use of the interactive application as determined from the application decisions, and RC amounts won, lost or accumulated as determined from the wager outcome data and the one or more credit meters.

In some embodiments, the wager outcome data 814 also includes data about one or more game states of a gambling game executed in accordance with a wagering proposition by a wager controller. In various such embodiments, the wagering user interface generator 834 generates a gambling game process display and/or gambling game state display using the one or more game states of the gambling game. The gambling game process display and/or gambling game state display is included in wager telemetry data that is communicated to an interactive controller. The gambling game process display and/or a gambling game state display is displayed by a wagering user interface of the interactive controller to a user. In other such embodiments, the one or more game states of the gambling game are communicated to an interactive controller and a wagering user interface of the interactive controller generates a gambling game process display and/or gambling game state display using the one or more game states of the gambling game for display to a user.

The application controller 860 can further operatively connect to a wager controller to determine an amount of credit or elements available and other wagering metrics of a wagering proposition. Thus, the application controller 860 may potentially affect an amount of RC in play for participation in the wagering events of a wagering game provided by the wager controller. The application controller 860 may additionally include various audit logs and activity meters. In some embodiments, the application controller 860 can also couple to a centralized server for exchanging various data related to the user and the activities of the user during game play of an interleaved wagering system.

In some embodiments, the operation of the application controller 860 does not affect the provision of a wagering proposition by a wager controller except for user choice parameters that are allowable in accordance with the wagering proposition. Examples of user choice parameters include, but are not limited to: wager terms such as but not limited to a wager amount; speed of game play (for example, by pressing a button or pulling a handle of a slot machine); and/or agreement to wager into a bonus round.

In a number of embodiments, communication of wager data between a wager controller and the application controller 860 can further be used to communicate various wagering control factors that the wager controller uses as input. Examples of wagering control factors include, but are not limited to, an amount of RC, AC, elements, or objects consumed per wagering event, and/or the user's election to enter a jackpot round.

In some embodiments, the application controller 860 utilizes a wagering user interface to communicate certain interactive application data to the user, including but not limited to, club points, user status, control of the selection of user choices, and messages which a user can find useful in order to adjust the interactive application experience or understand the wagering status of the user in accordance with the wagering proposition in the wager controller.

In some embodiments, the application controller 860 utilizes a wagering user interface to communicate aspects of a wagering proposition to the user including, but not limited to, odds of certain wager outcomes, amount of RC, AC, elements, or objects in play, and amounts of RC, AC, elements, or objects available.

In a number of embodiments, a wager controller can accept wager proposition factors including, but not limited to, modifications in the amount of RC, AC, elements, or objects wagered on each individual wagering event, a number of wagering events per minute the wager controller can resolve, entrance into a bonus round, and other factors. In several embodiments, the application controller 860 can communicate a number of factors back and forth to the wager controller, such that an increase/decrease in a wagered amount can be related to the change in user profile of the user in the interactive application. In this manner, a user can control a wager amount per wagering event in accordance with the wagering proposition with the change mapping to a parameter or component that is applicable to the interactive application experience.

Referring now to FIG. 6B, application controller 860 includes a bus 862 providing an interface for one or more processing modules 864, random access memory (RAM) 866, read only memory (ROM) 868, machine-readable storage medium 870, one or more user output devices 872, one or more user input devices 874, and one or more network interface devices 876.

The one or more processing modules 864 may take many forms, such as, but not limited to: one or more processors; a central processing unit (CPU); a multi-processor unit (MPU); an ARM processor; a programmable logic device; or the like.

Examples of output devices 872 include, include, but are not limited to: display screens; light panels; and/or lighted displays. In accordance with particular embodiments, the one or more processing modules 864 are operatively connected to audio output devices such as, but not limited to: speakers; and/or sound amplifiers. In accordance with many of these embodiments, the one or more processing modules 864 are operatively connected to tactile output devices like vibrators, and/or manipulators.

Examples of user input devices 874 include, but are not limited to: tactile devices including but not limited to, keyboards, keypads, foot pads, touch screens, and/or trackballs; non-contact devices such as audio input devices; motion sensors and motion capture devices that the application controller can use to receive inputs from a user when the user interacts with the application controller 860.

The one or more network interface devices 876 provide one or more wired or wireless interfaces for exchanging data and commands between the application controller 860 and other devices that may be included in an interleaved wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 870 stores machine-executable instructions for various components of the application controller 860 such as, but not limited to: an operating system 878; one or more applications 880; one or more device drivers 882; and interleaved wagering system wager controller instructions 854 for use by the one or more processing modules 864 to provide the features of a wager controller as described herein.

In various embodiments, the machine-readable storage medium 870 is one of a (or a combination of two or more of) a hard drive, a flash drive, a DVD, a CD, a flash storage, a solid state drive, a ROM, an EEPROM, and the like.

In operation, the machine-executable instructions are loaded into memory 866 from the machine-readable storage medium 870, the ROM 868 or any other storage location. The respective machine-executable instructions are accessed by the one or more processing modules 864 via the bus 862, and then executed by the one or more processing modules 864. Data used by the one or more processing modules 864 are also stored in memory 866, and the one or more processing modules 864 access such data during execution of the machine-executable instructions. Execution of the machine-executable instructions causes the one or more processing modules 864 to control the application controller 860 to provide the features of an interleaved wagering system application controller as described herein.

Although the application controller 860 is described herein as being constructed from one or more processing modules and instructions stored and executed by hardware components, the application controller can be composed of only hardware components in accordance with other embodiments. In addition, although the storage medium 870 is described as being operatively connected to the one or more processing modules through a bus, those skilled in the art of application controllers will understand that the storage medium can include removable media such as, but not limited to, a USB memory device, an optical CD ROM, magnetic media such as tape and disks. Also, the storage medium 870 can be accessed by processor 864 through one of the interfaces or over a network. Furthermore, any of the user input devices or user output devices can be operatively connected to the one or more processing modules 864 via one of the interfaces or over a network.

In various embodiments, the application controller 860 may be used to construct other components of an interleaved wagering system as described herein.

In some embodiments, components of wager controller and an application controller of a wagering interleaved system may be constructed using a single device using processes that communicate using an interprocess communication protocol. In other such embodiments, the components of a wager controller and an application controller of a wagering interleaved system may communicate by passing messages, parameters or the like.

In numerous embodiments, any of a wager controller, an application controller, or an interactive controller as described herein can be constructed using multiple processing devices, whether dedicated, shared, or distributed in any combination thereof, or can be constructed using a single processing device. In addition, while certain aspects and features of interleaved wagering system processes described herein have been attributed to a wager controller, an application controller, or an interactive controller, these aspects and features can be provided in a distributed form where any of the features or aspects can be provided by any of a wager controller, an application controller, and/or an interactive controller within an interleaved wagering system without deviating from the spirit of the invention.

Although various components of interleaved wagering systems are discussed herein, interleaved wagering systems can be configured with any component as appropriate to the specification of a specific application in accordance with embodiments of the invention. In certain embodiments, components of an interleaved wagering system, such as an application controller, a wager controller, and/or an interactive controller, can be configured in different ways for a specific interleaved wagering system.

Operation of Wagering Interleaved Systems

Figure 7:
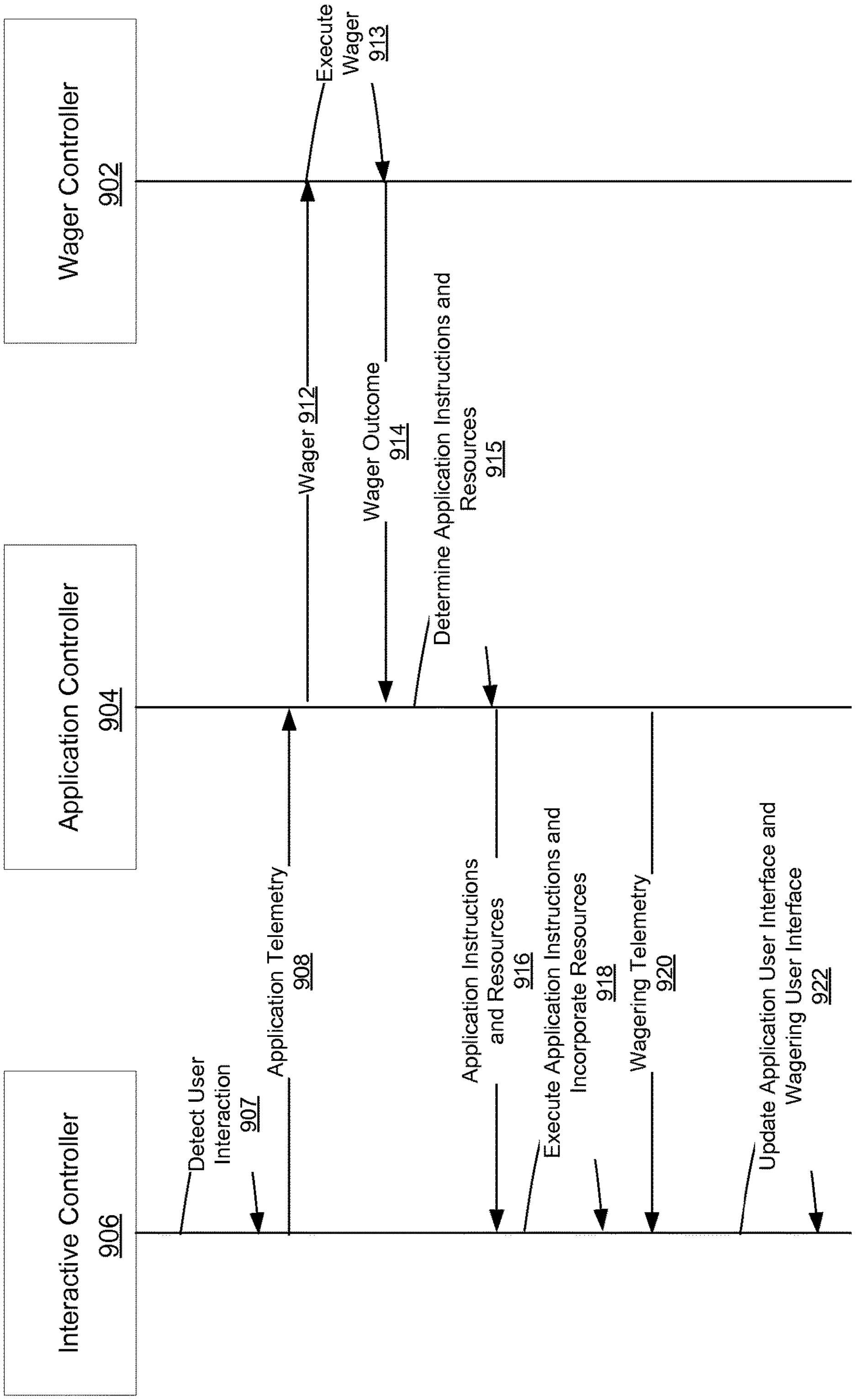
FIG. 7 is a sequence diagram of interactions between components of an interleaved wagering system in accordance with various embodiments of the invention.

FIG. 7 is a sequence diagram of interactions between components of an interleaved wagering system in accordance with various embodiments of the invention. The components of the interleaved wagering system include a wager controller 902, such as wager controller 102 of FIG. 1, an application controller 904, such as application controller 112 of FIG. 1, and an interactive controller 906, such as interactive controller 120 of FIG. 1. The process begins with the interactive controller 906 detecting a user performing a user interaction in a user interface of an interactive application provided by the interactive controller 906. The interactive controller 906 communicates application telemetry data 908 to the application controller 904. The application telemetry data includes, but is not limited to, the user interaction detected by the interactive controller 906.

The application controller 904 receives the application telemetry data 908. Upon determination by the application controller 904 that the user interaction indicates a wagering event, the application controller 904 communicates wager data 912 including a wager request to the wager controller 902. The request for a wager event may include wager terms associated with a wagering proposition.

The wager controller receives the wager data and uses the wager data to execute (913) a wager in accordance with a wagering proposition. The wager controller 902 communicates a wager outcome 914 of the executed wager to the application controller 904.

The application controller 904 receives the wager outcome and determines (915) interactive application instructions and resources 916 for the interactive application. The application controller 904 communicates the interactive application instructions and resources 916 to the interactive controller 906. The application controller also communicates wagering telemetry data 920 including the wager outcome to the interactive controller 906.

The interactive controller 906 receives the interactive application instructions and resources 916 and wagering telemetry data 918. The interactive controller 906 incorporates the received interactive application resources and executes the received interactive application instructions (918). The interactive controller updates (922) an application user interface of the interactive application provided by the interactive controller using the interactive application instructions and the resources, and updates (922) a wagering user interface using the wagering telemetry data.

In several embodiments, a user can interact with an interleaved wagering system by using RC for wagering in accordance with a wagering proposition along with AC and elements in interactions with an interactive application. Wagering can be executed by a wager controller while an interactive application can be executed by an interactive controller and managed with an application controller.

Figure 8:
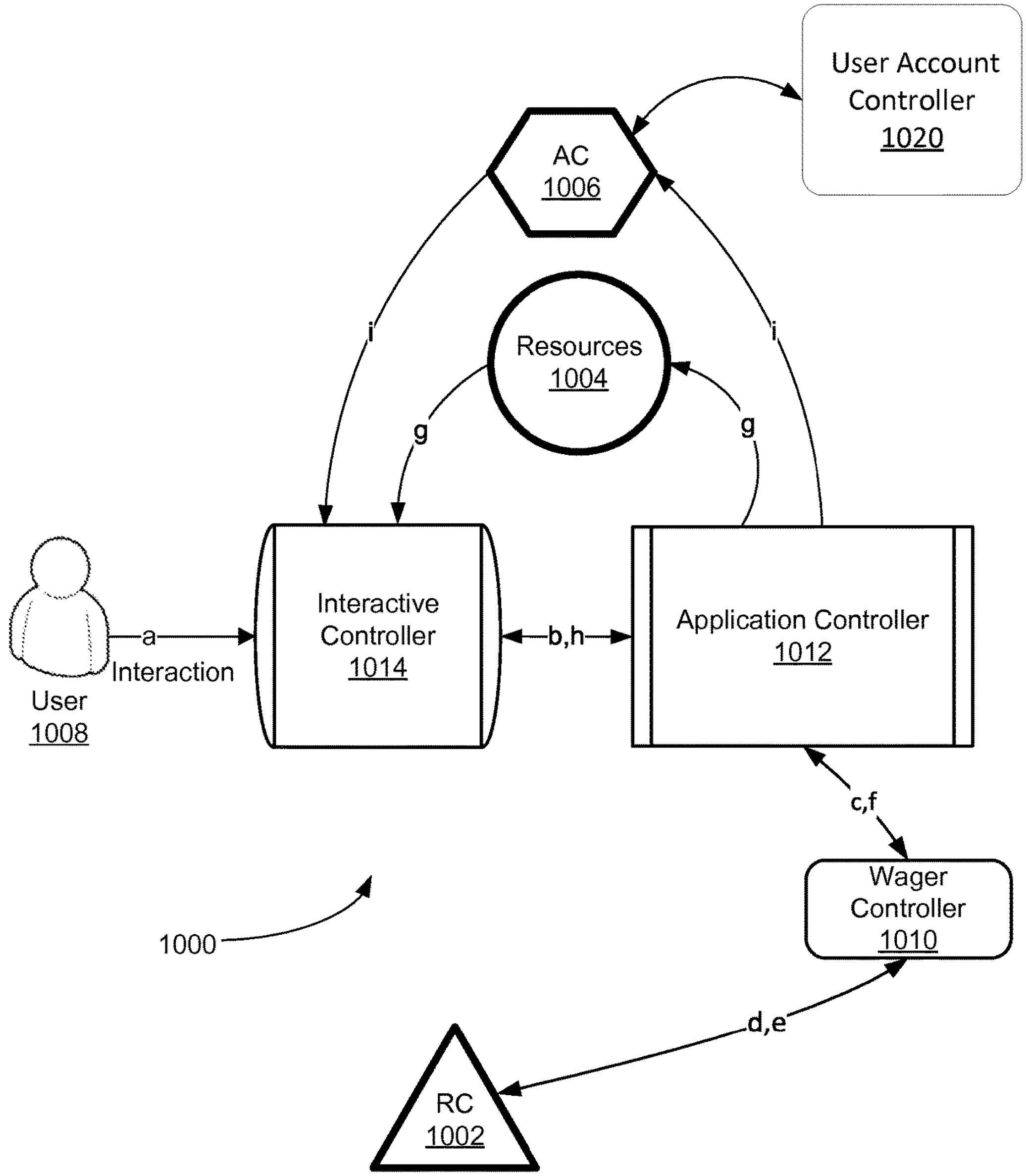
FIG. 8 is a collaboration diagram for components of an interleaved wagering system in accordance with various embodiments of the invention.

FIG. 8 is a collaboration diagram that illustrates how resources such as AC, RC, elements, and objects are utilized in an interleaved wagering system in accordance with various embodiments of the invention. The collaboration diagram 1000 illustrates that RC 1002, interactive application resources including elements and objects 1004 and AC 1006 can be utilized by a user 1008 in interactions with a wager controller 1010, such as wager controller 102 of FIG. 1, an application controller 1012, such as wager controller 112 of FIG. 1, and an interactive controller 1014, such as interactive controller 120 of FIG. 1, of an interleaved wagering system. The contribution of elements and objects such as included in resources 1004, can be linked to a user's access to credits, such as RC 1002 and/or AC 1006. Electronic receipt of these credits can come via a smart card, voucher or other portable media, or as received over a network from a server. In some embodiments, these credits can be drawn on demand from a user profile located in a database locally on an interleaved wagering system or in a remote server.

A user's actions and/or decisions can affect an interactive application of interactive controller 1014 that consume and/or accumulate AC 1004 and/or resources 1004 in an interactive application executed by an interactive controller 1014, a wager controller 101 and an application controller 1012. The application controller 1012 can monitor the activities taking place within an interactive application executed by an interactive controller 1014 for wagering event occurrences. The application controller 1012 can also communicate the wagering event occurrences to the wager controller 1010 that triggers a wager of RC 1002 in accordance with a wagering proposition executed by the wager controller 1010.

In several embodiments, the user commences interaction with the interleaved wagering system by contributing credit to an interleaved wagering system such as, but not limited to, RC 1002 that may be credit in a real currency or may be credit in a virtual currency that is not fungible with a real currency, AC 1006 that may be application environment credits, and specified types of interactive application elements and/or objects 1004. One or more of these contributions may be provided directly as currency and/or transferred in electronically. Electronic transfer may come via a smart card, voucher or other portable media, or as transferred in over a network from a user data server or interleaved wagering system user account server. In many embodiments, contributions may be drawn on demand from user accounts located in servers residing on the network or in the cloud on a real time basis as the credits, elements and/or object are committed or consumed by the interleaved wagering system. Generally, RC is utilized and accounted for by the wager controller 1010; and the resources 1004 and AC 1006 are utilized and accounted for by the application controller 1012 and/or the interactive controller 1014. The user interacts (a) with an interactive application provided by the interactive controller 1014 with the interaction representing an action by the user within the context of the interactive application. The interactive controller 1014 receives the user interaction and communicates (b) the interaction to the application controller 1012. The application controller 1012 receives the interaction and determines from the interaction whether or not a wager should be triggered. If a wager should be triggered, the application controller 1012 communicates (c) wager data about a wager in accordance with a wagering proposition associated with the interaction and thereby triggers a wager. The wager controller receives the wager data and executes the wager in accordance with the wagering proposition, and consumes (d) an appropriate amount of RC 1002 for the wager. The wager controller 1010 adjusts (e) the RC 1002 based upon a wager outcome of the wager and communicates (f) the wager outcome to the application controller 1012 as to the outcome of the wager triggered by the application controller 1012. The application controller 1012 receives the wager outcome. The application controller determines what resources 1004 should be provided to the interactive controller and communicates (g) the resources 1004 to the interactive controller. The interactive controller receives the resources from the application control and integrates them into the execution of the interactive application provided by the interactive controller 1014.

In some embodiments, the application controller 1012 communicates (h) data about the wager outcome to the interactive controller. The interactive controller receives the wager outcome and displays the wager outcome to the user 1008.

In some embodiments, the application controller 1012 determines what resources and instructions to provide to the interactive controller 1014 for use by the interactive application provided by the interactive controller 1014 partially on the basis of the wager outcome. In some such embodiments, resources are provided in a case that the wager was a winning wager for the user. In other such embodiments, fewer or no resources are provided in a case of a losing wager.

In some embodiments, the application controller 1012 determines what resources to provide based on internal logic of the application controller 1012. In some such embodiments, the application controller 1012 employs a random result generator, such as a P/RNG, to generate a random result and the random result is used to determine what resources are provided to the interactive controller 1014.

In several embodiments, the application controller 1012 determines an increment or a decrement of an amount of AC 1006 using the interactions received from the interactive controller. The increment or decremented amount is communicated (i) to the interactive controller for display to the user.

In some embodiments, the application controller 1012 executes a wager of RC as a virtual currency, AC, elements or objects. In some such embodiments, the application controller 1012 employs a random result generator, such as a P/RNG, to generate a random result and the random result is used to determine a wager outcome in RC as a virtual currency, AC, elements or objects.

The following is description of an embodiment of the described collaboration where an interactive application provided by an interactive controller of an interleaved wagering system is a first person shooter game. The process begins by a user selecting a machine gun to use in the game and then fires a burst of bullets at an opponent. The interactive controller can communicate to the application controller of the user's choice of weapon, that a burst of bullets was fired, and/or the outcome of the burst. The application controller communicates to the wager controller that 3 credits (RC) are to be wagered on the outcome of a wagering event to match the three bullets consumed. The wager controller then performs the wagering event and determines the result of the wager and may determine the winnings from a paytable. The wager controller consumes 3 credits of RC for the wager and executes the specified wager. By way of example, the wager controller may determine that the user hit a jackpot of 6 credits and returns the 6 credits to the RC and communicates to the application controller that 3 net credits were won by the user.

The application controller communicates to the interactive controller to add 3 bullets to an ammunition clip. The interactive controller adds 3 bullets back to the ammo clip. The ammunition may be added by directly adding the ammunition to the clip or by allowing the user to find extra ammunition during use. The application controller logs the new user score (AC) in the game (as a function of the successful hit on the opponent) based on the interactive controller communication, and adds 2 extra points to the user score since a jackpot has been won. The application controller then adds 10 points to the user score (AC) given the success of the hit which in this example is worth 8 points, plus the 2 extra point. Note that this example is only intended to provide an illustration of how credits flow in an interleaved wagering system, but is not intended to be exhaustive and only lists only one of numerous possibilities of how an interleaved wagering system may be configured to manage its fundamental credits.

In many embodiments, user account controller 1020, such as user account controller 150 of FIG. 1, an interleaved wagering system is used to store AC for use of the user. In such an embodiment, AC is generated by the application controller based on the user's use of the interleaved wagering system and an amount of the AC is communicated to the user account controller 1020. The user account controller stores the amount of AC between sessions. In some embodiments, the user account controller communicates an amount of AC to the application controller at the start of a session for use by the user during a session.

Interactive applications may include supplementary modes of operation. For example, a skill-based interactive game may include supplementary bonus rounds and/or boss rounds. A bonus round may involve one or more challenges through which a user can acquire additional benefit (e.g., application environment credit, real credit, enabling elements, or resources) with minimal risk associated with the opportunity (e.g., little to no consumption of resources, such as real credit or enabling elements). A boss round may involve a skill-based challenge that is typically of higher difficulty than an average level of skilled application interaction, and may involve the opportunity for the user to acquire a substantial benefit for successful completion of the boss round. In some embodiments, the supplementary mode must be completed (e.g., the boss must be defeated) before further use of the application is allowed. Execution of the supplementary mode of an interleaved wagering system may involve components of the interleaved wagering system as described herein. Use of the components and interaction between components of the interleaved wagering system in the supplementary mode is consistent with the interleaved wagering system as described herein. For example, an interactive controller, interactive application, application controller, and wager controller used in an interleaved wagering system may be used in executing a supplementary mode of the interleaved wagering system.

In some embodiments, the benefit associated with the supplemental mode of the interleaved wagering system may be a portion of resources committed by the user during interactive application interaction. For example, if the user loses 100 units of enabling elements during application interaction, a portion of the 100 units of enabling elements may be eligible for recovery by the user for successful completion of the supplementary mode.

In many embodiments, the benefit associated with the supplemental mode of the interleaved wagering system may be a portion of credits committed to wagering by the user during interactive application interaction.

In various embodiments, the benefit pool is in the form of a lottery and the benefits provided to the user are in the form of a draw from the lottery pool.

In many embodiments, wagering is performed using virtual credits that do not have value and are not available for cashout into a real currency while the benefit has value in a real currency and is available for cashout.

In some embodiments, the benefit associated with the supplemental mode of the interleaved wagering system may be provided by a third party source. For example, an operator of the supplemental mode of the interleaved wagering system may contribute a benefit, such as application environment credit, or real credit. The operator may contribute the benefit in order to promote use of the interactive application.

In some embodiments, the benefit associated with the supplemental mode of the interleaved wagering system may be accumulated over time. For example, a portion of resources committed by one or more users during application interaction may be allocated to a benefit pool. The collection period of the resources may be over a span of rounds, application sessions, hours, days, weeks, months, or any other time period.

Successful completion of the supplemental mode of the interleaved wagering system may be based (a) entirely upon skill, (b) entirely upon chance, or (c) a combination of skill and chance. In some embodiments, successful completion of the supplemental mode based entirely upon skill means a gambling game is not explicitly engaged to determine a payout. In some embodiments, successful completion of the supplemental mode based entirely upon chance means the player's skill is not relevant; the payout is determined as a function of a RNG.

Successful completion of the supplemental mode may be solely based upon the user's performance, or may be based on the user's performance relative to others, either as a function of participating in a multi-user application session, or as a function of comparison of the user's performance to other users in individual application sessions.

The user may or may not be aware of the benefit to be awarded upon successful completion of the supplemental mode. Upon successful completion of the supplemental mode, the user may be awarded the entirety of the benefit pool, or may be awarded a portion of the benefit pool. In some embodiments, the portion awarded is based on the user's interaction with the application. For example, the portion awarded to a user may be based on a score achieved by the user in a game, compared to the performance of other users. The performance of other users to be taken into consideration may be over a period of time (e.g., a day, a week, a month, a year) or over a single application session (e.g., a multi-user session of the interactive application).

The supplemental mode of the interleaved wagering system may be triggered in various ways. Triggering may be based on application interaction time of the user, credits committed by the user, credits lost by the user, credits won by the user, in-application events, or by the operator or other non-user related circumstances. For example, the supplemental mode may be triggered when the user interacts with the application for a threshold amount of time. In another example, the supplemental mode may be triggered when the user loses a threshold amount of real world credits or enabling elements. In another example, the supplemental mode may be triggered when the user wins a threshold amount of resources, such as real world credits or application environment credits. In another example, the secondary mode may be triggered based on a schedule provided by the operator. In some embodiments, triggering of the secondary mode is independent of the user's interactions with the system.

In some embodiments, normal operation of the interactive application may be interrupted by the supplemental mode. In some embodiments, the supplemental mode must be completed in order to return to normal operation of the interactive application. In some embodiments, the supplemental mode must be successfully completed to return to normal operation of the interactive application. In some embodiments, any completion of the supplemental mode (success or failure) is sufficient to return to normal operation of the interactive application.

During the course of the supplemental mode of the interleaved wagering system, users may receive communication regarding the status of the benefit pool, rules of successful completion of the supplemental mode, or availability of the supplemental mode.

In some embodiments, an interactive application is an interactive game. In some embodiments, the interactive game may include optional challenges or bosses. In some embodiments, the optional challenge allows a user to acquire additional benefit (e.g., points, goods, weapons, power ups) while providing little or no down side to the user (e.g., there is not the prospect of losing a life in the game, consuming game resources such as time, bullets, etc.). In some embodiments, it is not required that the optional round be completed (e.g., the boss defeated) before proceeding further in the interactive game.

In some embodiments, an optional challenge or boss is structured so that it represents an opportunity for the user to access additional, bonus wagering, bonus points, or other benefit(s). In another embodiment, the optional challenge or boss accumulates additional funds as committed to the round by an operator, such as a casino, through a marketing budget or other mechanism. Access to the optional challenge may be either (a) fully based upon skill, (b) fully random—i.e. not a function of skill, or (c) a combination of chance and skill, as described herein. In (a), a wager controller is not explicitly engaged to determine a payout. In (b), the user's skill is not relevant; beyond the requirement to defeat the boss and/or complete the bonus round, the payout is determined as a function of a P/RNG, as described herein.

In some embodiments, unlike access to the challenge, the optional challenge itself may be fully based upon skill. The user may win the benefits by defeating the optional challenge or boss. The user's success in winning the funds in the bonus and/or boss round may depend solely upon the user's performance relative to the interactive game, or it can be a function of the user's performance relative to others, either as a function of participating in a multi-user game session, or as a function of the user's performance relative to other players, each of whom is involved in a single user game session.

Users may compete concurrently, in parallel, or sequentially in a challenge. In an example embodiment, one or more eligible users may elect to participate in an optional boss battle. The user that successfully locates and defeats the optional boss may win the challenge. If competing concurrently, users may have to defeat other users prior to defeating the boss. If competing in parallel, the users may not interact with each other, but face the same challenge at the same time. If competing sequentially, the users may face the same challenge at different times.

Success in the optional challenge may grant access to additional wagering options at low or no cost, different pay tables, free entertainment play, or additional optional challenges. A skilled user may compete in an optional challenge, successfully complete the challenge, and then continue with another optional challenge. The secondary challenge may be accessible only through completion of the first challenge, but neither would be necessary to proceed further in the interactive game. Success in a secondary optional challenge may generate a tertiary challenge and so forth.

Figure 9:
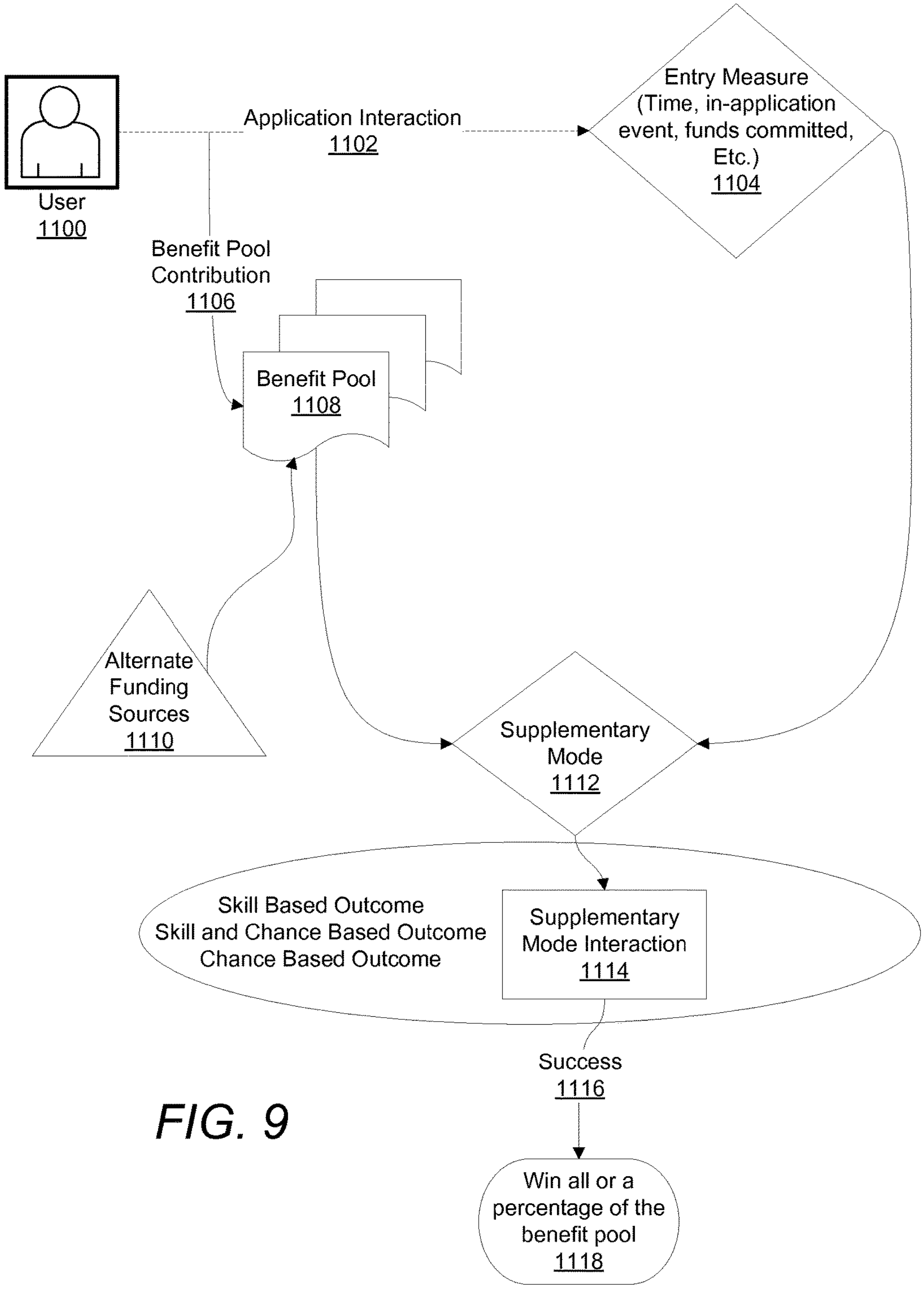
FIG. 9 is a diagram of interactions between various components of the system and processes in accordance with various embodiments of the invention.

FIG. 9 is a diagram of interactions between various components of the system and processes in accordance with various embodiments of the invention. A user 1100 performs application interaction 1102. The application interaction may be with an interactive application as described herein, provided by an interactive controller of an interleaved wagering system. In some embodiments, the interaction application is an interactive game. In some embodiments, the interactive game is a skill-based interactive game. In some embodiment, the interactive game is a chance-based game. As described herein, a portion of a wager made during interaction with the interleaved wagering system is a benefit pool contribution 1106 sent to a benefit pool 1108.

After completion of the application interaction 1102, (or in some embodiments, during application interaction 1102), an entry measure is performed 1104. An entry measure may include measurements of various parameters that may trigger initiation of a supplementary mode of the interleaved wagering system. For example, the entry measure 1104 may track time spent by the user 1100 using the interactive application. When the time spent by the user 1100 reaches a threshold value, a supplementary mode 1112 may be triggered and provided to the user 1100.

Upon entering a supplementary mode 1112, the user 1100 is eligible to be awarded some amount of benefits from the benefit pool 1108. As described herein, benefit pool contributions 1106 during execution of the interleaved wagering system may be included in the benefit pool 1108. The benefit pool 1108 may also be sourced from alternate funding sources 1110, such as a third party. An example of a third party may be a sponsor or operator of the interactive application or the interleaved wagering system.

Upon triggering of the supplementary mode 1112, the user 1100 interacts with the supplementary mode 1114. The supplementary mode interaction 1114 and determination of a successful outcome for the user 1100 may be based on skill, chance, or a combination thereof. If the user 1100 is successful 1116, the user 1100 is awarded all of the benefit pool 1108 or a portion of the benefit pool 1108. For example, if the interactive application is a skill-based interactive game, and the supplementary mode is a boss round, the user 1100 may have to defeat the boss, through skillful play of the interactive game, in order to be successful. As described herein, the amount of the benefit pool 1108 awarded to the user 1100 may be based on the user's performance alone or based on the user's performance compared to the performance of others.

Figure 10:
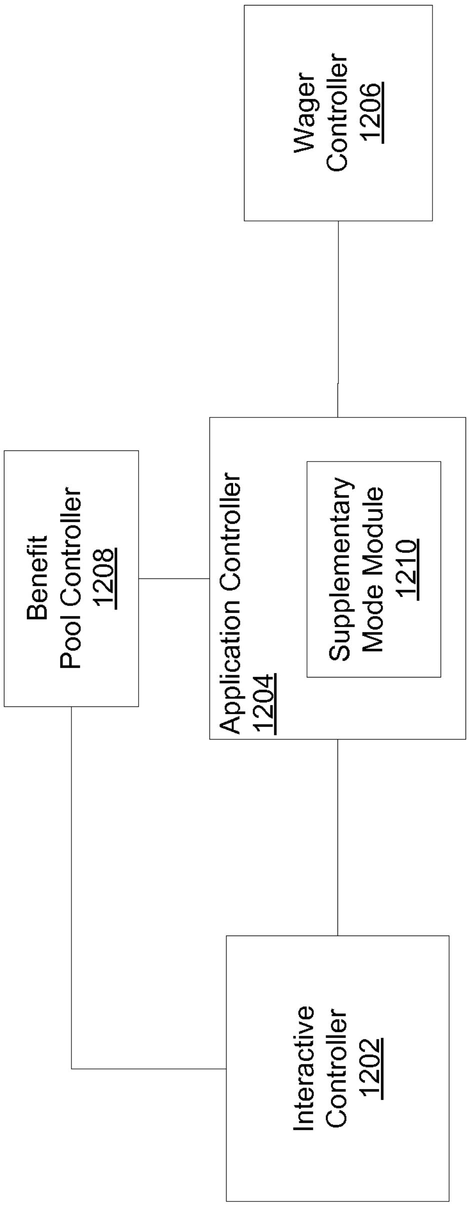
FIG. 10 is a diagram of the structure of an interleaved wagering system in accordance with various embodiments of the invention.

FIG. 10 is a diagram of the structure of an interleaved wagering system in accordance with various embodiments of the invention. The interleaved wagering system includes an interactive controller 1202, an application controller 1204, and a wager controller 1206, as described herein. The interactive controller 1202 may provide an interactive application. In some embodiments, the interactive application is an interactive game. In some embodiments, the interactive game is a skill-based interactive game. In some embodiments, the interactive game is a chance-based interactive game.

The system further includes a benefit pool controller 1208. As described herein, the benefit pool controller 1208 controls the benefits to be awarded to a user upon successful interaction with a supplementary mode of the interleaved wagering system. For example, when the benefit pool controller 1208 receives a request for benefits, the benefit pool controller 1208 may coordinate communication or transfer of the corresponding benefit award amount to the user. The benefit pool controller 1208 may further store the benefits to be awarded to the user upon successful interaction with the supplementary mode. The benefit pool controller 1208 is operatively connected to the application controller 1204 and the interactive controller 1202. The benefit pool controller 1208 may be connected to the application controller 1204 and the interactive controller 1202 via a network connection.

The benefit pool controller 1208 may also be responsible for determining a benefit award amount to award multiple interactive controllers participating in a multi-user supplementary mode session. That is, when a user's benefit award amount is based on the user's performance relative to the performance of other users in a common supplementary mode session, the benefit pool controller 1208 may receive the scores of the users participating in the common supplementary mode session, and divide the total benefits accordingly. In this case, the benefit pool controller 1208 is operatively connected to other application controllers and interactive controllers. For example, if there are total benefits of 1000 real world credits and 3 users participating in a supplementary mode session, the benefit pool controller 1208 receives the scores for the 3 users from their corresponding application controllers, via a network, and divides the 1000 real world credits accordingly. If the rules of the supplementary mode session indicate that the highest scoring user receives the entirety of the total benefits, the benefit pool controller 1208 will award the 1000 real world credits to the highest scoring user. If the rules of the supplementary mode session indicate that the total benefits will be divided proportionally based on the scores of the users, the benefit pool controller 1208 determines portions of the 1000 real world credits to award to the 3 users.

The application controller 1204 further includes a supplementary mode module 1210. The supplementary mode module 1210 may be responsible for triggering the supplementary mode. For example, the supplementary mode module 1210 may monitor various parameters, such as time spent by the user, user loss of credits, user earning of credits. When a monitored parameter meets a threshold value, the supplementary mode module 1210 triggers execution of the supplementary mode. In some embodiments, triggering of the supplementary mode includes communicating, to the interactive controller, an indication to provide a supplementary mode session. The supplementary mode module 1210 may also trigger execution of the supplementary mode based on a condition other than monitored parameters. For example, the condition may be a time-based trigger or receiving an indication from a third party source to trigger the supplementary mode.

The interactive controller 1202, upon receiving an indication to provide a supplementary mode session, provides the supplementary mode session, such as a bonus round or a boss round. When the user successfully completes the supplementary mode session, benefits are received from the benefit pool controller 1208 and the supplementary mode session is concluded.

Figure 11:
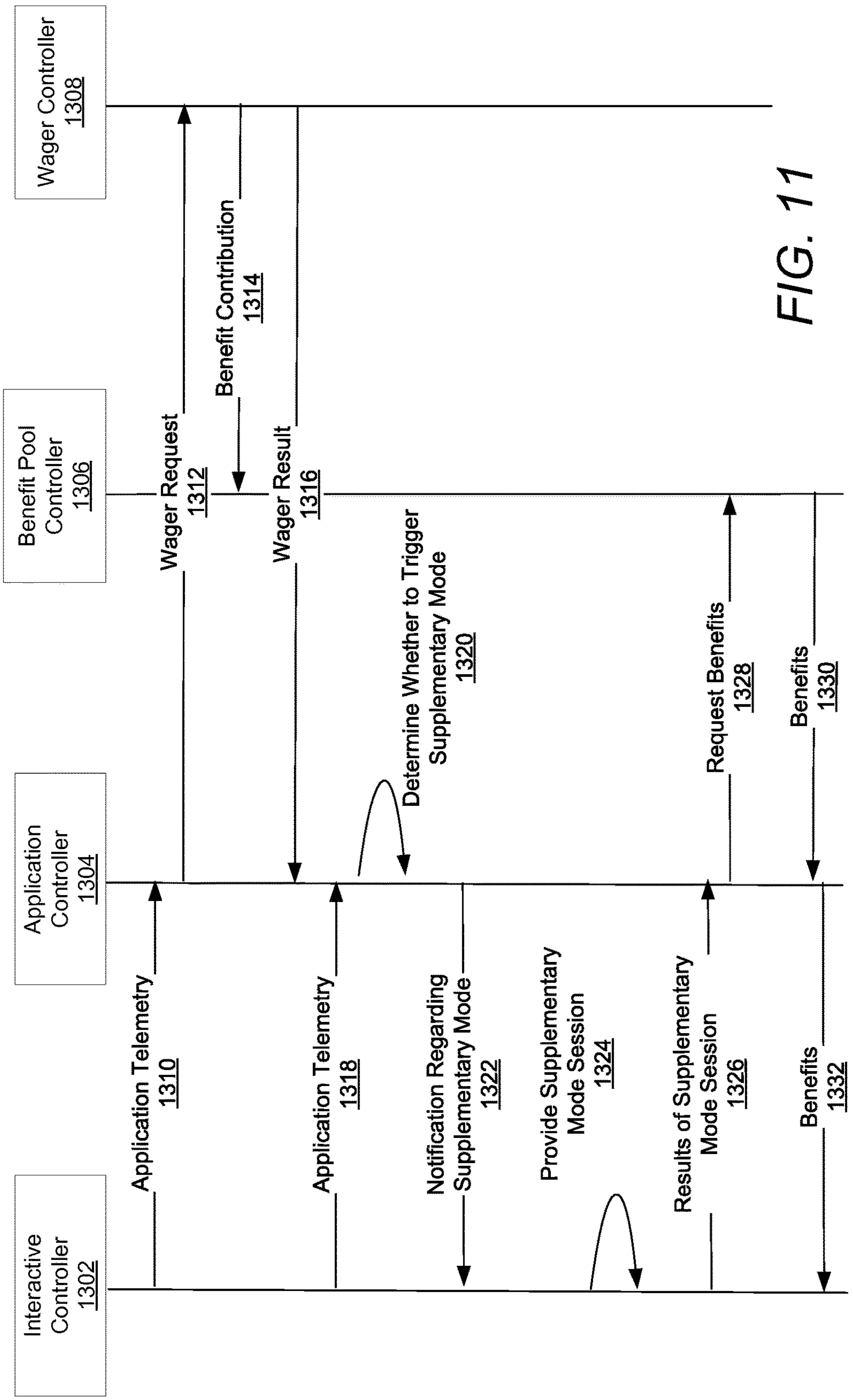
FIG. 11 is a sequence diagram of interactions between components of an interleaved wagering system in accordance with various embodiments of the invention.

FIG. 11 is a sequence diagram of interactions between components of an interleaved wagering system in accordance with various embodiments of the invention. The system includes an interactive controller 1302, an application controller 1304, a benefit pool controller 1306, and a wager controller 1308, as described herein.

The interactive controller 1302 communicates application telemetry to the application controller 1304 (1310). The application telemetry is based on an interactive application provided by the interactive controller 1302. In some embodiments, the interactive application is an interactive game. In some embodiments, the interactive game is a skill-based interactive game. In some embodiments, the interactive game is a chance-based interactive game.

The application controller 1304 receives the application telemetry from the interactive controller 1302 (1310). Based on the received application telemetry, the application controller 1304 determines whether a wager request should be triggered. When a wager request is triggered, the application controller 1304 communicates, to the wager controller 1308, a wager request (1312).

The wager controller 1308 receives the wager request from the application controller 1304 (1312). In some embodiments, upon receiving a wager request from the application controller 1304, the wager controller 1308 communicates an amount of benefit to the benefit pool controller 1306 (1314). For example, the wager controller 1308 may communicate a real world credit amount to the benefit pool controller 1306 that is a portion of the wager amount associated with the wager request. The benefit pool controller 1306 receives the benefit contribution from the wager controller 1308 (1314).

Upon receiving the wager request, the wager controller 1308 also determines a wager result and communicates the wager result to the application controller 1304 (1316). The application controller 1304 receives the wager result from the wager controller 1308 (1316). Steps 1310-1316 may be repeated any number of times, in accordance with various embodiments of the invention.

Interactive controller 1302 communicates, to the application controller 1304, application telemetry (1318). The application controller 1304 receives the application telemetry from the interactive controller 1302 (1318). Upon receiving the application telemetry, the application controller determines whether to trigger a supplementary mode (1320). As described herein, the determination of whether to trigger a supplementary mode may be performed by a supplementary mode module within the application controller 1304. Also as described herein, the determination may be based on whether one or more parameters meet a threshold value or may be based on another trigger, such as a time-based trigger or receiving an indication from a third party source (not shown).

When triggering a supplementary mode is determined, the application controller 1304 communicates a notification regarding the supplementary mode to the interactive controller 1302 (1322). The notification regarding the supplementary mode may be an indication to the interactive controller 1302 to provide a supplementary mode to the user. As described herein, the supplementary mode may be a bonus round and/or a boss round.

The interactive controller 1302 receives a notification regarding the supplementary mode, from the application controller 1304 (1322). Upon receiving the notification, the interactive controller 1302 provides the supplementary mode session (1324). For example, if the interactive application is a skill-based interactive game, and the supplementary mode is a boss round, the user may be required to defeat the boss through skillful play of the interactive game in order to complete the supplementary mode session.

Upon completion of the supplementary mode session, the interactive controller 1302 communicates results of the supplementary mode session to the application controller 1304 (1326). The application controller 1304 receives the results of the supplementary mode session from the interactive controller 1302 (1326). The results of the supplementary mode session may be a score achieved by the user and may also include an indication of success or failure.

Based on the results of the supplementary mode session, the application controller 1304 communicates a request for benefits to the benefit pool controller 1306 (1328). The benefit pool controller 1306 receives the request for benefits from the application controller (1328). In some embodiments, the request for benefits includes the score of the user. Based on the received request for benefits, the benefit pool controller 1306 communicates benefits to the application controller 1304 (1330). The application controller 1304 receives the benefits from the benefit pool controller 1306 (1330). The application controller 1304 communicates the received benefits to the interactive controller 1302 (1332). The interactive controller 1302 receives the benefits from the application controller 1304 (1332). In some embodiments, the benefit pool controller 1306 communicates the benefits to the interactive controller 1302 directly.

While the above description may include many specific embodiments of the invention, these should not be construed as limitations on the scope of the invention, but rather as examples of embodiments thereof. It is therefore to be understood that the present invention can be practiced otherwise than specifically described, without departing from the scope and spirit of the present invention. Thus, embodiments of the present invention described herein should be considered in all respects as illustrative and not restrictive.

What is claimed:

1. An interleaved wagering system, comprising:

an interactive controller constructed to communicate, to an application controller, a first application telemetry associated with an interactive application provided by the interactive controller;

a wager controller constructed to communicate, to the application controller, a wager result associated with a received wager request; and the application controller operatively connected to the interactive controller and the wager controller, and constructed to:

receive, from the interactive controller, the first application telemetry;

communicate the wager request to the wager controller;

receive, from the wager controller, the wager result;

communicate, to the interactive controller, updated user resources based on the received wager outcome;

receive, from the interactive controller, a second application telemetry;

upon receiving the application telemetry, determine whether to trigger a supplementary mode;

when triggering the supplementary mode is determined, communicate, to the interactive controller, a notification to provide a supplementary mode session, wherein the interactive controller is further constructed to:

receive, from the application controller, the updated user resources;

provide the updated user resources within the interactive application;

communicate, to the application controller, the second application telemetry;

receive, from the application controller, the notification to provide the supplementary mode session;

provide the supplementary mode session;

communicate, to the application controller, results of the supplementary mode session, and wherein the application controller is further constructed to:

receive, from the interactive controller, the results of the supplementary mode session; and when the received results are successful, communicate, to a benefit pool controller, a request for benefits.

2. The interleaved wagering system of claim 1, wherein the interactive controller and the application controller are constructed from the same device, and wherein the application controller is operatively connected to the wager controller by a network.

3. The interleaved wagering system of claim 1, wherein the wager controller and the application controller are constructed from the same device, and wherein the application controller is operatively connected to the interactive controller by a network.

4. The interleaved wagering system of claim 1, wherein the application controller is further constructed to store a parameter value; and update the parameter value based on the received application telemetry, and wherein triggering the supplementary mode is based on whether the updated parameter value exceeds a threshold value.

5. The interleaved wagering system of claim 1, wherein triggering the supplementary mode is based on an indication received from a third party.

6. The interleaved wagering system of claim 1, wherein the benefit pool controller is constructed to:

accumulate a benefit pool;

receive, from the application controller, a request for benefits; and communicate, to the application controller, benefits, based on the request for benefits.

7. The interleaved wagering system of claim 6, wherein the benefit pool is accumulated based on a benefit contribution received from the wager controller.

8. The interleaved wagering system of claim 6, wherein the benefit pool is accumulated based on benefits received from a third party, wherein the third party is an operator of the interleaved wagering system.

9. The interleaved wagering system of claim 1, wherein the results of the supplementary mode session is based on skill.

10. The interleaved wagering system of claim 1, wherein the results of the supplementary mode session is based on chance.

11. The interleaved wagering system of claim 1, wherein the results of the supplementary mode session is based on skill and chance.

12. An application controller of an interleaved wagering system, comprising:

an interactive controller interface operatively connecting the application controller to an interactive controller constructed to communicate, to an application controller, a first application telemetry associated with an interactive application provided by the interactive controller;

a wager controller interface operatively connecting the application controller to a wager controller constructed to communicate, to the application controller, a wager result associated with a received wager request; and one or more processing modules constructed to:

receive, from the interactive controller, the first application telemetry;

communicate the wager request to the wager controller;

receive, from the wager controller, the wager result;

communicate, to the interactive controller, updated user resources based on the received wager outcome;

receive, from the interactive controller, a second application telemetry;

upon receiving the application telemetry, determine whether to trigger a supplementary mode;

when triggering the supplementary mode is determined, communicate, to the interactive controller, a notification to provide a supplementary mode session, wherein the interactive controller is further constructed to:

receive, from the application controller, the updated user resources;

provide the updated user resources within the interactive application;

communicate, to the application controller, the second application telemetry;

receive, from the application controller, the notification to provide the supplementary mode session;

provide the supplementary mode session;

communicate, to the application controller, results of the supplementary mode session, and wherein the application controller is further constructed to:

receive, from the interactive controller, the results of the supplementary mode session; and when the received results are successful, communicate, to a benefit pool controller, a request for benefits.

13. The interleaved wagering system of claim 12, wherein the interactive controller and the application controller are constructed from the same device, and wherein the application controller is operatively connected to the wager controller by a network.

14. The interleaved wagering system of claim 12, wherein the wager controller and the application controller are constructed from the same device, and wherein the application controller is operatively connected to the interactive controller by a network.

15. The interleaved wagering system of claim 12, wherein the application controller is operatively connected to the wager controller by a network, and wherein the application controller is operatively connected to the interactive controller by a network.

16. The interleaved wagering system of claim 12, wherein the application controller is further constructed to store a parameter value; and update the parameter value based on the received application telemetry, and wherein triggering the supplementary mode is based on whether the updated parameter value exceeds a threshold value.

17. The interleaved wagering system of claim 12, wherein triggering the supplementary mode is based on an indication received from a third party.

18. The interleaved wagering system of claim 12, wherein the benefit pool controller is constructed to:

accumulate a benefit pool;

receive, from the application controller, a request for benefits; and communicate, to the application controller, benefits, based on the request for benefits.

19. The interleaved wagering system of claim 18, wherein the benefit pool is accumulated based on a benefit contribution received from the wager controller.

20. The interleaved wagering system of claim 18, wherein the benefit pool is accumulated based on benefits received from a third party, wherein the third party is an operator of the interleaved wagering system.

21. The interleaved wagering system of claim 12, wherein the results of the supplementary mode session is based on skill.

22. The interleaved wagering system of claim 12, wherein the results of the supplementary mode session is based on chance.

23. The interleaved wagering system of claim 12, wherein the results of the supplementary mode session is based on skill and chance.

24. An interleaved wagering system, comprising:

a wager controller constructed to communicate, to the application controller, a wager result associated with a received wager request; and an application controller of an interleaved wagering system operatively connecting the wager controller to an interactive controller by a network, the application controller constructed to:

receive, from the interactive controller, a first application telemetry;

communicate the wager request to the wager controller;

receive, from the wager controller, the wager result;

communicate, to the interactive controller, updated user resources based on the received wager outcome;

receive, from the interactive controller, a second application telemetry associated with an interactive application provided by the interactive controller;

upon receiving the second application telemetry, determine whether to trigger a supplementary mode;

when triggering the supplementary mode is determined, communicate, to the interactive controller, a notification to provide a supplementary mode session;

receive, from the interactive controller, the results of the supplementary mode session; and when the received results are successful, communicate, to a benefit pool controller, a request for benefits.

25. An interleaved wagering system, comprising:

an interactive controller of an interleaved wagering system constructed to communicate, to an application controller, a first application telemetry associated with an interactive application provided by the interactive controller; and an application controller of an interleaved wagering system operatively connecting the interactive controller to a wager controller, the application controller constructed to:

receive, from the interactive controller, the first application telemetry;

communicate the wager request to the wager controller;

receive, from the wager controller, the wager result;

communicate, to the interactive controller, updated user resources based on the received wager outcome;

receive, from the interactive controller, a second application telemetry;

upon receiving the second application telemetry, determine whether to trigger a supplementary mode;

when triggering the supplementary mode is determined, communicate, to the interactive controller, a notification to provide a supplementary mode session, wherein the interactive controller is further constructed to:

receive, from the application controller, the updated user resources;

provide the updated user resources within the interactive application;

communicate, to the application controller, the second application telemetry;

receive, from the application controller, the notification to provide the supplementary mode session;

provide the supplementary mode session;

communicate, to the application controller, results of the supplementary mode session, and wherein the application controller is further constructed to:

receive, from the interactive controller, the results of the supplementary mode session; and when the received results are successful, communicate, to a benefit pool controller, a request for benefits.

* * * * *